United States Patent
Hare et al.

(10) Patent No.: US 7,321,113 B2
(45) Date of Patent: *Jan. 22, 2008

(54) PRECISION MATERIAL-HANDLING ROBOT EMPLOYING HIGH-RESOLUTION, COMPACT ABSOLUTE ENCODER

(75) Inventors: Alva E. Hare, Marlborough, MA (US); Keith M. Hinrichs, Natick, MA (US); William G. Thorburn, Whitinsville, MA (US)

(73) Assignee: GSI Group Corporation, Billerica, MA (US)

( * ) Notice: Subject to any disclaimer, the term of this patent is extended or adjusted under 35 U.S.C. 154(b) by 101 days.

This patent is subject to a terminal disclaimer.

(21) Appl. No.: 11/137,675

(22) Filed: May 25, 2005

(65) Prior Publication Data

US 2005/0258986 A1    Nov. 24, 2005

(51) Int. Cl.
*H03M 1/48* (2006.01)
(52) U.S. Cl. .................. 250/231.13; 341/116
(58) Field of Classification Search .......... 250/231.13–231.18; 341/7, 115–117
See application file for complete search history.

(56) References Cited

U.S. PATENT DOCUMENTS

| | | | |
|---|---|---|---|
| 4,443,788 A | 4/1984 | Breslow | 340/347 |
| 4,445,110 A | 4/1984 | Breslow | 340/347 |
| 5,121,116 A | 6/1992 | Taniguchi | 341/116 |
| 5,677,686 A | 10/1997 | Kachi et al. | 341/8 |
| 5,965,879 A | 10/1999 | Leviton | 250/231.13 |
| 5,991,249 A | 11/1999 | Lee | 369/44.42 |
| 6,366,047 B1 | 4/2002 | Horwitz et al. | 318/602 |
| 6,424,928 B1 | 7/2002 | Elliott et al. | 702/151 |
| 6,563,443 B2 | 5/2003 | Oberhauser | 341/115 |
| 6,577,985 B2 | 6/2003 | Scalf | 702/163 |
| 6,615,156 B2 | 9/2003 | Elliott et al. | 702/151 |
| 2003/0062470 A1 | 4/2003 | Burgschat et al. | 250/231.18 |

FOREIGN PATENT DOCUMENTS

EP    0 575 843 B1    12/1993

OTHER PUBLICATIONS

"Code-Drehgeber," product manual of Heidenhain, Oct. 1990.

*Primary Examiner*—Georgia Epps
*Assistant Examiner*—Tony Ko
(74) *Attorney, Agent, or Firm*—BainwoodHuang

(57) ABSTRACT

An absolute encoder employs multiple sub-encoders of different resolutions and a linking algorithm for combining the sub-encoder outputs to form an accurate, high-resolution position estimate. The sub-encoders can utilize edge modulation of a main grating track, sloped patterns of successively higher periods, and other types of scale patterns. The sub-encoders can also use a variety of detector types suitable for the patterns being used. In one linking approach, pairs of tracks are linked together successively by applying a phase shift to the coarser track and then combining it with the finer track such that the transitions of the coarse track estimates become aligned with those of the finer track, whereupon the values can be combined to form a linked position estimate. In another approach, beat tracks are calculated from physical tracks of similar period, and the beat tracks are used as the coarser tracks in the linking process. A wafer-handling robot employs the absolute encoder for controlling rotation of multiple joints.

11 Claims, 22 Drawing Sheets

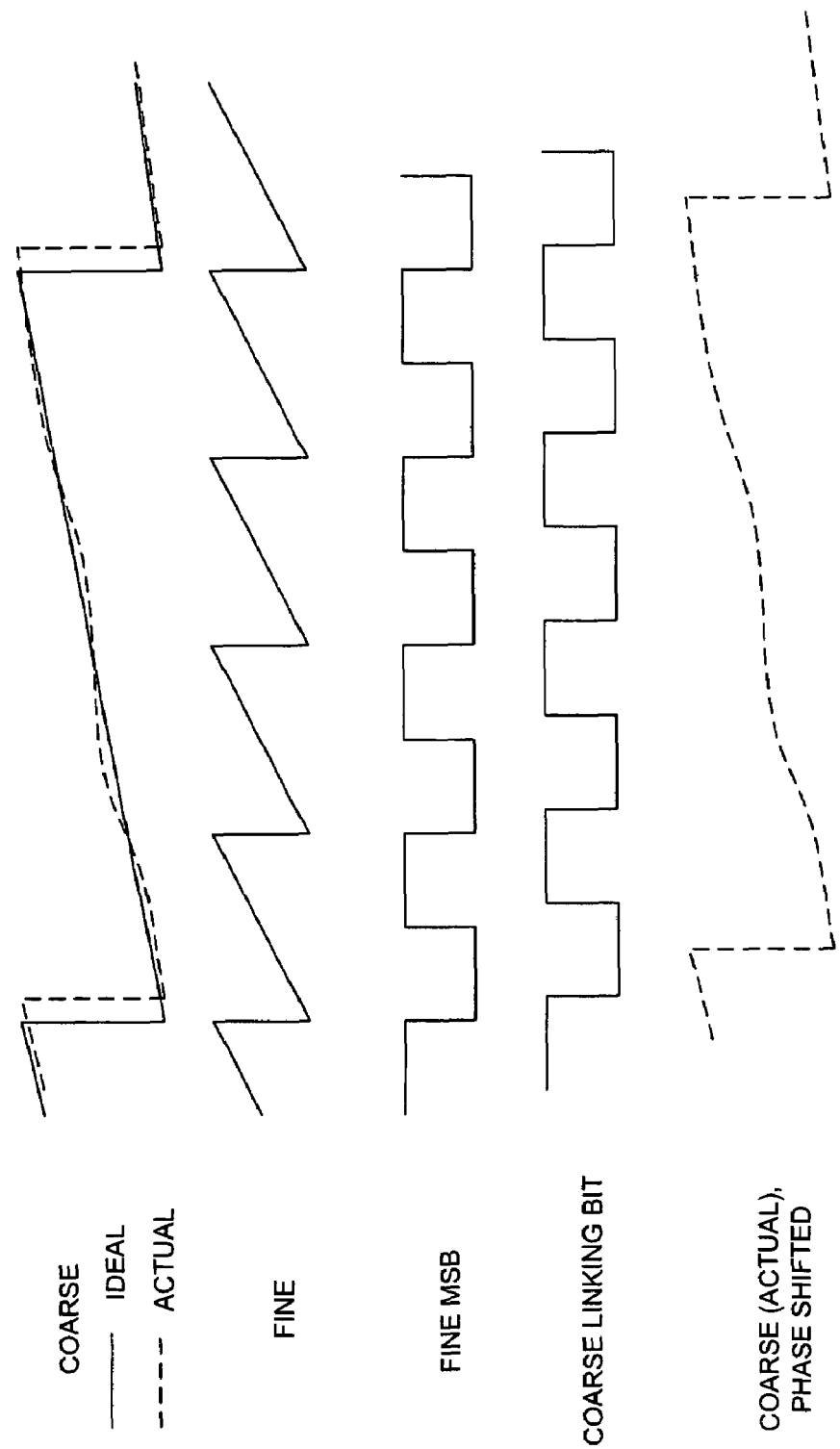

PRECISION MATERIAL-HANDLING ROBOT EMPLOYING HIGH-RESOLUTION, COMPACT ABSOLUTE ENCODER

CROSS REFERENCE TO RELATED APPLICATIONS

This application claims priority under 35 U.S.C. § 120 of U.S. patent application Ser. No. 10/990,769 filed Nov. 17, 2004, which claims priority under 35 U.S.C. § 119(e) of U.S. provisional patent application 60/520,926 filed Nov. 17, 2003.

BACKGROUND

The present invention is related to the field of position encoders.

Position encoders can be incremental or absolute. A sensing unit of an incremental encoder senses position within an individual cycle between two scale graduations, but has no information about which cycle of the scale is being read. Typically, incremental encoder sensing units are combined with electronics to perform up/down counting of scale cycles. Thus, once an initial point on the scale has been identified, the encoder system measures displacement along the scale by reference to the up/down counters. Incremental encoders may not be useful in many applications, because any interruption in the inputs invalidates the displacement estimate in the counters. For example, if the scale is obscured at any point (perhaps by dirt), the counters will not register the proper value on the far side of the obscuration. Similarly, in the case of a power interruption, the encoder has no information about scale motions during the interruption. In either case, it is necessary to perform some initialization procedure to re-establish the encoder's reference.

Some incremental encoders employ an index, or reference, mark built into the scale. A separate sensing mechanism is usually required to detect the passing of the index mark. The index mark is typically used to reset the counters to a predetermined value, such as zero. However, this reset can only be effected by purposely moving the scale to force the index mark to pass the sensing mechanism.

In contrast to incremental encoders, absolute encoders employ sensing units that generate a complete or "absolute" position indication for each point on the scale without the need to count scale cycles as the scale moves. Absolute encoders do not require a position history, such as provided by a counter, and consequently their position indications are not invalidated by power interruptions or other events that require re-referencing an incremental encoder.

A classic approach for relatively low resolution absolute encoders incorporates multiple code tracks, each successive track being a factor of 2 more coarse. Thus, if there are $2^N$ cycles in the scale, there are N tracks, which, when taken together, provide an N-bit cycle-identifying word. In one variation, Gray encoding is used to ensure that the code values change monotonically with movement of the scale.

Recently, a pseudo-absolute encoder has been introduced in which a cycle-identifying code is spread out over several cycles. If there are $2^N$ cycles on the scale, the N bits of the code are spread over N adjacent cycles. Thus, to uniquely identify any particular cycle, the bit value at the current cycle is combined with the bits from the immediately adjacent N-1 cycles, which must have been sensed and remembered. The cycle-identifying code is a pseudo-random chain code, which means that the sequence of bits along the entire length of the code is such that, taken N bits at a time, no sequence repeats over the $2^N$ cycles and each adjacent N-bit code word has the same bit sequence as its neighbor, except for either the left-most or right-most bit in the pseudo-random position word, and that the other N-1 bits are right or left shifted respectively.

Yet another approach to building an absolute encoder is taught in U.S. Pat. No. 5,965,879. The incremental scale and associated cycle-identifying code are imaged onto a 2-dimensional array detector, such as a CCD. The thus captured image is processed using image processing algorithms that mimic the way a human would read a ruler. One portion of the algorithm tracks the relative position of the incremental scale's lines as they move across the field of view, while the second portion of the algorithm interprets the cycle-identifying code. The output of the combined algorithm is the absolute displacement in the form: "the Mth cycle is 10 microns from the edge of the field, so the absolute displacement is M*P+10 microns, where P is the period of the scale".

Yet another class of absolute encoders uses multiple periodic scale tracks with no explicit cycle-identifying code. These encoders are exemplified by U.S. Pat. No. 6,366,047. These encoders employ a number of fine tracks of similar period. The fine tracks are combined algebraically to form "beat" tracks of lower spatial frequency (or longer spatial period). The beat tracks are used to identify coarse position along the scale, which can be combined with position information from one of the fine tracks to arrive at an overall absolute position indication.

Absolute position encoders have found use in a variety of applications including material-handling robots such as wafer-handling robots in semiconductor manufacturing.

SUMMARY

Each of the above absolute encoders suffers from drawbacks. The basic N-track approach becomes unwieldy (physically large) for high resolution systems (N large) and is difficult to align. The code-spreading approach, in which the information in the N tracks is effectively coded into the single track, must be jogged for several cycles before it knows where it is after a signal loss. The approach of the '879 patent is limited in frame rate by the image processing engine, and the multi-track approach of the '047 patent can experience significant errors due to an inherent magnification of errors in any of the fine tracks. An absolute encoder that avoids these disadvantages would be desirable.

Disclosed is an absolute encoder with a multi-track scale including at least two periodic tracks which are algorithmically linked to enable the encoder to generate high-precision absolute position estimates. The period of a first track is exceeded by the period of a second track by a track ratio, and the tracks have a phase relationship with a certain magnitude of uncertainty. For example, the relative phase between the two tracks may vary by plus or minus one-quarter of a cycle of the first track. This phase variation may arise due to grating runout, eccentricity (in rotary encoders), and misalignment, among other things.

Detector circuitry in the encoder is operative in response to periodic energy patterns from the tracks to generate corresponding sets of analog signals, the analog signals within each set representing amplitudes of the corresponding energy pattern at respective predetermined spatial locations. In the disclosed optical encoder, the detector circuitry includes photodetectors. In encoders based on other sensing technology, such as magnetics, the scale and detector circuitry will be realized by analogous magnetic components.

Processing circuitry in the encoder is operative in response to the sets of analog signals to perform a track linking process, which is a mathematical algorithm that transfers all of the accuracy and resolution of the first track to the second track. As an initial step, first and second position estimates are generated. The first position estimate represents a position sample of the first track modulo the first track period. The second position estimate represents a position sample of the second track modulo the second track period and scaled with respect to the first position estimate to account for the track ratio. The second position estimate has sufficient resolution that a least significant part of the second position estimate overlaps a corresponding most significant part of the first position estimate by at least a minimum overlap amount, which is determined by the magnitude of uncertainty of the phase relationship between the first and second tracks. In an exemplary embodiment, both the first and second tracks are interpolated to 10 bits of resolution, and the least-significant five bits of the second track position estimate overlap the most-significant five bits of the first track position estimate. That is, the least-significant five bits of the second track position estimate represents the position of the second track over a range and to a resolution that are the same as the range and resolution of the first track position represented by the most-significant five bits of the first track position estimate. In such an embodiment, the uncertainty of the phase relationship between the first and second tracks may be as high as about 0.94 of the period of the first track.

The first position estimate is then subtracted from the second position estimate to create a corrected second position estimate. This subtraction is accompanied by filtering or smoothing that eliminates phase noise present in the original second position estimate. Also, a phase adjustment may be included to account for an average phase offset between the two tracks. As a result of these operations, the sample-to-sample transitions of the most-significant part of the corrected second position estimates become precisely aligned with the period-to-period transitions of the first position estimates. Consequently, the two values can be combined readily (e.g., by concatenation) to form a position estimate representing the position of the scale modulo the second track period but to a higher resolution that includes the full resolution of the first position estimate.

The above linking process can be repeated for additional tracks to extend the range of position measurements provided by the encoder. In one class of encoders, the linking is simply repeated, each time using the result of the last iteration and a next successive track. For example, if a third track were included, it would be linked with the linked track resulting from the above linking process of the first two tracks. The linking could be accomplished in exactly the same fashion as described above. It will be appreciated that each track will have a successively greater period, and the final track will typically have a period greater than or equal to the overall length of the scale (or, in a rotary application, greater than or equal to the circumference of the annular scale).

Another class of encoders employ what are referred to as "beat tracks", which are mathematical tracks created by performing a subtraction between position estimates of tracks having distinct but generally similar periods. In such encoders, beat tracks of greater period can be created by proper selection of the periods of the tracks from which the beat tracks are created. For example, if two tracks having periods of 500 microns and 520 microns are beat together, a beat track having a period of 13 mm can be created. The position estimates of a beat track are generated from the position estimates of the tracks from which the beat track is created. Thus, if a beat track is created from two tracks that have both been linked to a fine track, the beat track can be linked to one of the tracks. The use of the mathematical beat tracks advantageously avoids the need for physical tracks of long period on the scale, which can be difficult to sense with a physically small detector. Additionally, because the beat tracks are all linked to the same fine track, they do not suffer the error-magnification problem of prior encoders employing the beat principle, and therefore can achieve greater accuracy.

Each individual track, when combined with the source that illuminates it and the detector that senses its fringes, constitutes an incremental encoder. For convenience, these track/sensor combinations are referred to herein as "subencoders". Several alternative embodiments for these subencoders are shown. For example, in one embodiment, the scale includes a 50:50 duty cycle grating, wherein the alternating lines of the grating are either transmissive/opaque, reflective/non-reflective, or phase delaying/non-phase delaying. The lines of the grating are oriented parallel to the cross-track direction and are positioned next to each other in the along-track direction. In the disclosed absolute encoder, a subencoder of this first type is employed as the highest resolution or "fine" position subencoder.

In a second subencoder embodiment, the scale includes a diagonal grating, which is a striped pattern slanted relative to the cross-track direction. When such a rotated grating pattern is translated in the along-track direction, the dark and light lines of the striped pattern appear to move in a cross-track direction, similar to the effect of a barber pole. Along-track scale motion is determined by detecting the cross-track stripe displacement.

In another embodiment, a subencoder scale is created by tailoring one or both of the along-track edges of a grating, such as the grating for the fine track. Position information is derived by intentionally varying the cross-track dimension of a grating track according to a periodic function of the along-track position. For example, the edge of the track may vary as a sawtooth or sinusoid function.

Other subencoder embodiments include the use of an cylindrical diffractive optical element (DOE) extended in the along-track direction and whose cross-track position varies periodically as a function of the along-track position. This DOE generates a focused line of light extending in the along-track direction, and the focused line of light moves in the cross-track direction with the same periodic function as the scale moves with respect to the detector. An alternative scale has a periodic array of cylindrical diffractive optical elements oriented with their diffracting power in the along-track direction, such that each DOE when illuminated forms a focused line of light extending in the cross-track direction. This line of light moves in the along-track direction as the scale moves. This type of optical pattern can be sensed by a detector having a response that varies sinusoidally in the along-track direction, an example of which is shown below.

Each of the subencoder embodiments further includes a suitably configured detector, disposed to detect the optical pattern changes that occur as the scale is displaced in the along-track direction. Additionally, each of the subencoder embodiments in which cross-track scale displacements cause an observable optical pattern change preferably includes a cross-track reference track. This reference track is preferably designed to be insensitive to along-track displacements.

In one particular application, the disclosed absolute position encoder is used as part of a precision material-handling robot such as a wafer-handling robot in a semiconductor manufacturing process. The robot includes a rotating member such as the shaft of a motor, and an annular scale affixed to the rotating member. The scale has a plurality of periodic optical tracks in a track area with a radial width W millimeters. W may be on the order of 5 millimeters for example. Detector circuitry is operative in response to periodic energy patterns from the tracks of the scale to generate sets of analog signals representing the amplitudes of the periodic energy patterns at predetermined spatial locations. Processing circuitry is operative in response to the analog signals to generate position estimates of the tracks and to combine the position estimates together in a track-linking manner which is effective to yield an absolute position indication of the rotating member to a resolution greater than 3·W bits. Thus when W is 5 millimeters for example, the resolution of the position indication of the rotating member is greater than 15 bits. In a particular embodiment disclosed herein, the resolution is on the order of 25 bits using a track area width W of 5 millimeters. Because of the high resolution that can be achieved per unit of radial width of the scale, the material-handling robot can execute very precise, well-controlled movements without requiring a footprint (space) typically associated with the use of larger absolute encoders.

The invention is described herein in terms of both a linear position sensor as well as rotary position sensors, where the along-track direction is understood to be around the circumference of an annular scale and the cross-track direction is understood to be the radial direction.

BRIEF DESCRIPTION OF THE SEVERAL VIEWS OF THE DRAWING

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

FIG. 15 is a waveform diagram showing waveforms of interest with respect to the combining process of FIG. 14;

DETAILED DESCRIPTION

The disclosures of U.S. patent application Ser. No. 10/990,769 filed Nov. 17, 2004 and U.S. provisional patent application 60/520,926 filed Nov. 17, 2003 are hereby incorporated by reference.

Figure 1:
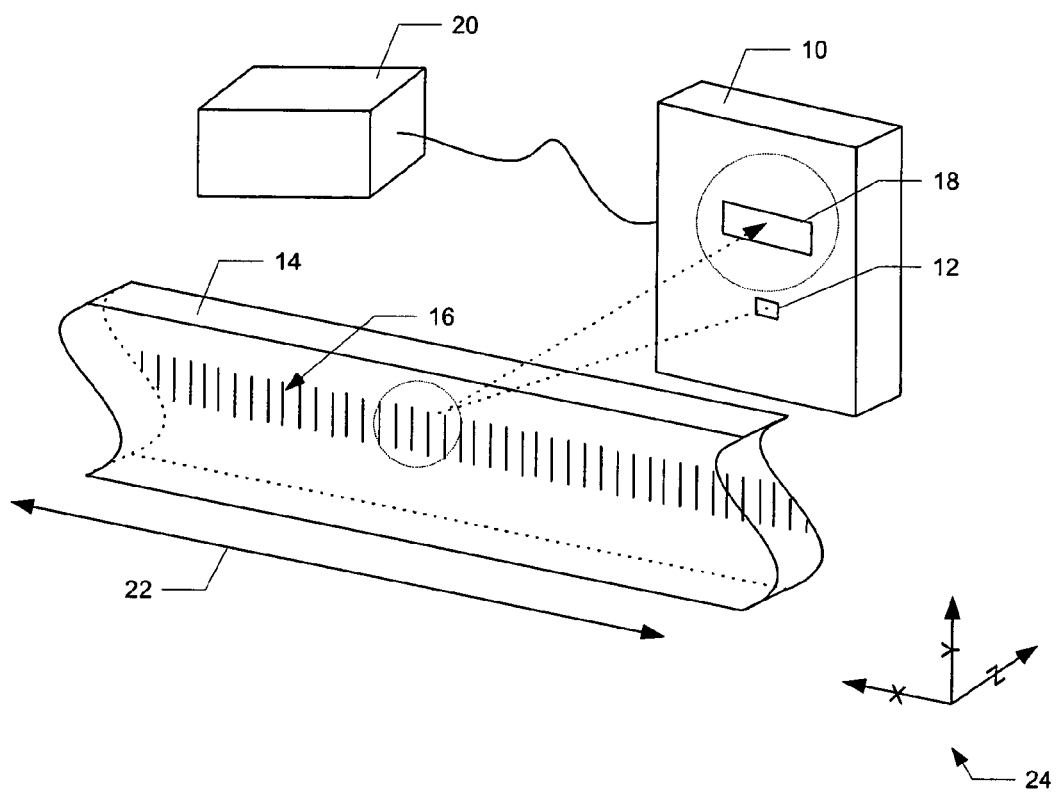
FIG. 1 is a schematic diagram of an optical encoder in accordance with the present invention.

In FIG. 1, sensor apparatus 10 is installed as part of a reflective, diffractive optical encoder. A source 12 illuminates a scale 14 on which a set of periodic, reflective diffraction gratings or tracks 16 have been created. Light from the source 12 is reflectively diffracted from the scale 14 toward the sensor apparatus 10, which in the illustrated embodiment includes an optical detector 18. The diffraction grating 16 generates multiple orders of diffracted light which interfere with each other to form optical fringe patterns (not illustrated) on the detector 18. The samples from the detector 18 are sent to an electronic processor 20 which uses the samples to calculate fringe phases for each track.

Each fringe pattern is ideally a sinusoid characterized by a period P. Conceptually, when the scale 14 moves laterally relative to the detector 18 along the direction indicated by line 22, the fringe pattern moves a proportional distance on the face of detector 18. An accurate measurement of the changes in the phase of the fringe pattern is a proportional measurement of the movement of the scale 14.

For ease of reference, a set of coordinate axes 24 are shown to indicate directions of interest. The direction of motion 22 lies along the X axis. The scale 14 lies in a plane extending in the X and Y directions, with the individual elements of the gratings 16 extending in the Y direction. The scale 14 and the sensor apparatus 10 are separated in the Z direction. It will be appreciated that the interference fringe pattern incident on the detector 18 extend in both the X and Y directions, with the grating-created intensity variations in the X direction and a typical beam profile in the Y direction (i.e., a central maximum and gradually lower intensity going outward along the Y axis).

Figure 2:
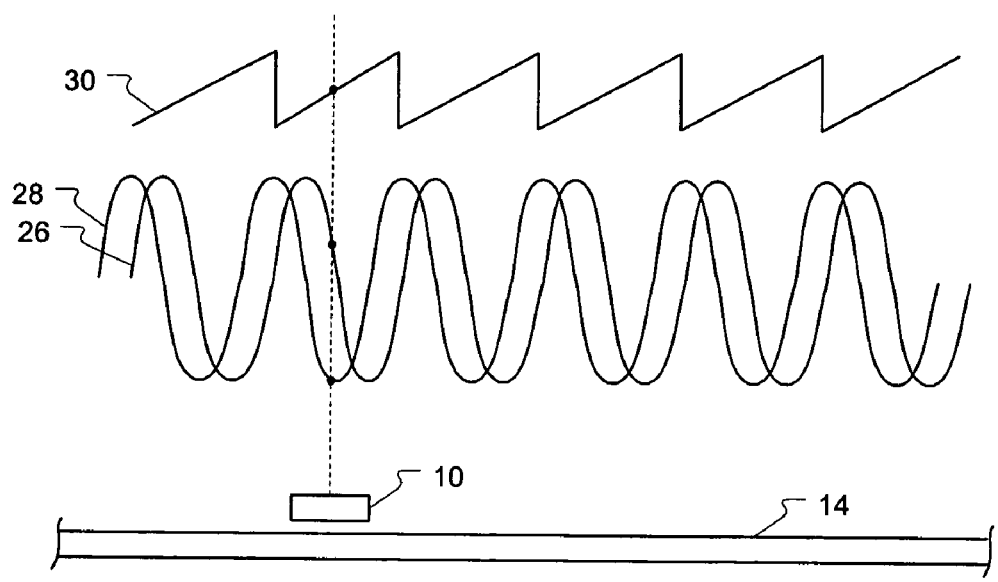
FIG. 2 is a waveform diagram depicting signals in the optical encoder of FIG. 1.

FIG. 2 illustrates, for one embodiment, the creation of position-varying signals by the sensor apparatus 10 as its X-axis position relative to the scale 14 changes for a single grating 16 on the scale. The signals can be generated by a technique referred to as "4-bin" sampling, due to its use of four sampling locations separated by ¼ of a fringe period. The sensor apparatus 10 generates first and second quasi-sinusoidal signals 26, 28 by sampling within an optical fringe at locations separated by ¼ of a fringe period or 90 degrees. The term "quasi-sinusoidal" is used because of various known non-idealities in any encoder implementation—the signals are ideally purely sinusoidal and separated by precisely 90 degrees. One signal (such as signal 26) is denoted the sine (SIN) signal, and the other (such as signal 28) is denoted the cosine (COS) signal. The selection is somewhat arbitrary, and can be made based on which direction of motion is to be denoted the "positive" versus the "negative" direction. It will be appreciated that the sensor apparatus 10 may be configured to sample the optical pattern at other spatial locations, for example at locations separated by ⅓ of a fringe period or other sub-multiples of a fringe period.

The analog SIN and COS signals 26 and 28 are sampled by analog-to-digital conversion circuitry (not shown) within the processor 20, and an arctangent (ARCTAN) signal 30 is calculated from the resulting digital values. The ARCTAN signal 30 has a ramp characteristic, rising linearly (ideally) from a minimum to a maximum over one fringe cycle. Thus, the amplitude of the ARCTAN signal is proportional to the perceived relative position of the sensor 10 and the scale 14 within a given fringe period. The calculation that results in the ARCTAN signal 30 is often referred to as "interpolation". For example, "10-bit interpolation" means that the relative position between the sensor 10 and the scale 14 within a given fringe period is known (ideally) to a resolution of $2^{-10}$, or approximately to one part in one-thousand. It will be appreciated that the smooth-profile ramp signal 30 of FIG. 2 is actually an approximation of a signal having 1,024-level quantization in such a system.

Signals of the type shown in FIG. 2 are commonly used in the industry, and may be utilized in encoders according to the present invention. In general, however, the presently disclosed techniques may be used with alternative types of signals. For example, an alternative sensor may generate a ramp signal such as ramp signal 30 directly, without any calculation of intermediate SIN and COS values.

Figure 3:
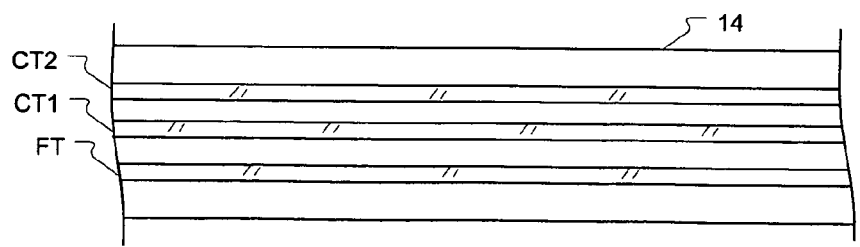
FIG. 3 is a diagram showing a portion of an optical scale in the optical encoder of FIG. 1.

FIG. 3 illustrates the general configuration of the optical gratings or tracks 16 on the scale 14. A first track of very fine pitch is referred to as the fine track FT. A typical pitch for track FT is 20 microns, for example. Two tracks of relatively coarser pitches are shown as tracks CT1 and CT2. Specific examples of coarse tracks are given below. It will be appreciated that FIG. 3 is for general illustrative purposes only; specific embodiments (examples of which appear below) may have only one coarse track or may have three or more coarse tracks, depending in part on the length of the scale 14. Another factor is whether or not the technique of "beat tracks", described below, is used.

In general, the tracks FT, CT1, CT2 . . . are used to provide an indication of absolute position at each point of the scale, in contrast to incremental encoders that provide an indication of position within a fringe and rely on either an internal or external counter to keep track of fringe crossings. Generally, the fine track FT provides the least-significant portion of the position estimate, and the coarser tracks provide the most-significant portion. The most-significant and least-significant values are combined to form a single, high-resolution number representing absolute position.

Figure 4:
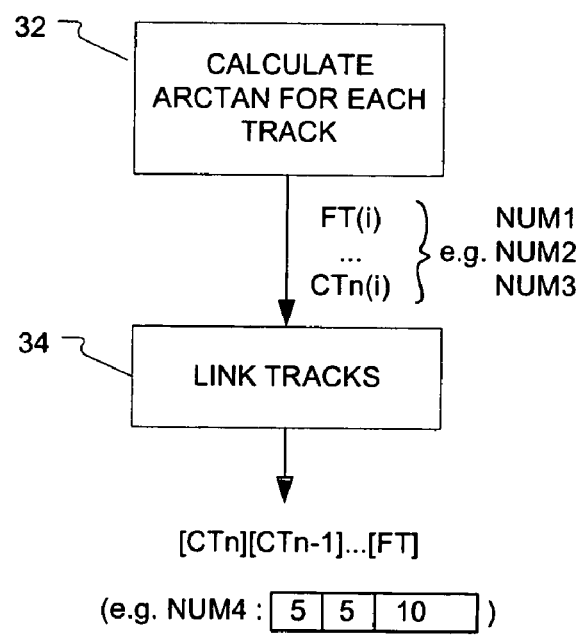
FIG. 4 is a flow diagram showing generally how position calculation is performed in the optical encoder of FIG. 1.

This process is illustrated more formally in FIG. 4. At step 32, the ARCTAN is calculated for each of the tracks, to a resolution of 10 bits for example. Example outputs labeled NUM1-NUMn are shown for the fine track FT and successive coarse tracks CTn. At step 34, these values are used in a "linking" process that links the values from the different tracks together so as to form a single output. In FIG. 4, this output is shown as having concatenated components [CTn][CTn-1] . . . [FT]. An example is shown as NUM4, which is a 20-bit value having 10 bits from track FT, 5 bits from track CT1, and 5 bits from track CT2. As described below, the linking process of step 34 is substantially more complex than simply picking corresponding bits from the various track outputs, due to the inherent imprecise alignment of the tracks with respect to each other. Rather, the more significant components of the final position estimate are arrived at by a process of phase-adjustment and smoothing, as described in more detail below.

Figure 5:
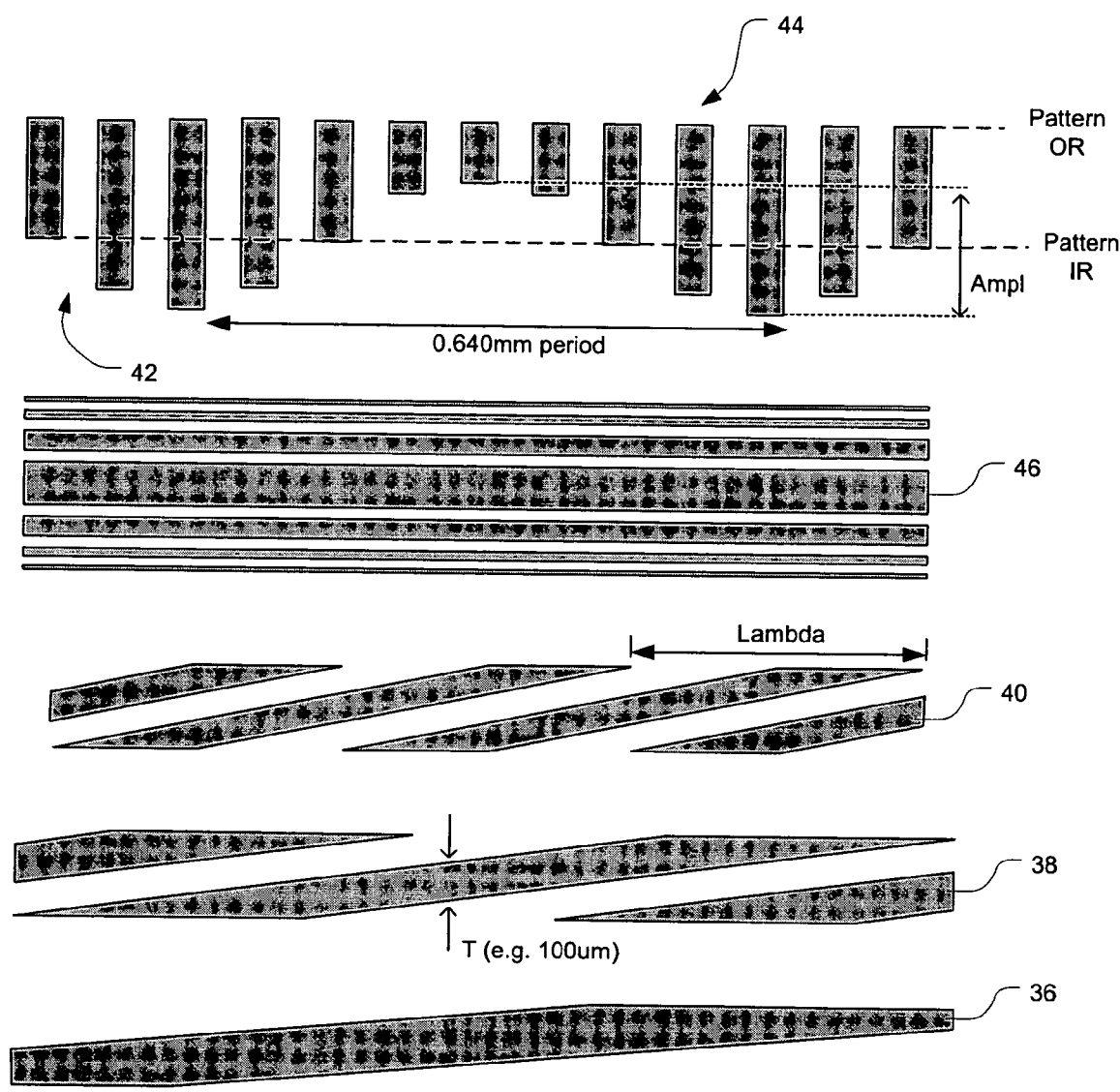
FIG. 5 is a diagram of a multiple-track (or multiple-grating) scale usable in the optical encoder of FIG. 1.

FIG. 5 shows a set of grating tracks including a fine track 44 and coarse tracks 36, 38 and 40 (not to scale). The coarsest track 36 has a period that equals the full range of the encoder (in a rotary application, coarse track 36 has a period of $2\pi$ radians), and the remaining tracks have periods that are some fraction of the period of coarse track 36. The period and interpolation level of the fine track 44 ultimately determine the resolution of the encoder. The fine track 44 has a period of 20 microns. A first coarse track 42 is defined by a periodic variation of one edge of the fine track 44. The first coarse track 42 has a period of 640 microns, which is 32 times the period of the fine track 44. A second coarse track 40 is 32 times more coarse than the first coarse track 42, with a period of 20.480 millimeters. A third coarse track 38 is again 32 times more coarse, with a period of 655.360 millimeters. FIG. 5 also illustrates a possible fourth coarse track 36, again a factor of 32 more coarse, but its period of 20.97 meters is unlikely to be needed in most applications. Note, however, that coarse track 36 could be made with a period that is, for example, 2 times longer than the previous track, giving a total encoder range of about 1.3 meters.

Additionally, FIG. 5 illustrates an optional reference track 46, which provides a measure of the instantaneous cross-track position of the scale 14 relative to the sensor apparatus 10. This cross-track measurement is an aid to initial encoder alignment and provides data to compensate for cross-track-to-along-track crosstalk inherent in certain track designs. This crosstalk is explained below.

The scale 14 may have other optional tracks or features not illustrated in FIG. 5. For example, the scale 14 may include an index mark to provide a reference point for the encoder that may be aligned to a physical point on the object whose position is being measured.

As mentioned, the absolute encoder includes a number of separate subencoders whose outputs are linked to arrive at the full position output. The subencoders operate as independent incremental encoders insofar as converting optical patterns from the respective tracks on the scale 14 into respective electrical signals indicating relative position of the subencoder. A light source may be shared by one or more subencoders.

Subencoder 1: In one embodiment the fine track 44 is an optical diffraction grating including alternating striped regions of high and low reflectance. A typical period for this embodiment is 20 microns. In one embodiment, this track is illuminated by a spatially coherent light source, and the diffracted light is preferably sensed with an interdigitated phased array detector. The light source may include a vertical cavity surface emission laser (VCSEL), and both the VCSEL source and the interdigitated array detector are disposed on a common substrate. Sensor apparatus 10 (FIG. 1) houses the substrate. The encoder in the '674 published application operates using Talbot interference, which does not require optical elements disposed between the source/detector and the scale. This configuration permits the separation between the sensor apparatus 10 and the scale 14 to be on the order of millimeters; in one typical embodiment the separation is 4.7 millimeters.

Subencoder 2: One embodiment for a coarse track subencoder includes the track illustrated in FIG. 5 as the first coarse track 42, a VCSEL source, and a so-called 4-bin detector array. As illustrated, the first coarse track 42 is formed by modulating the length of the grating lines that form the fine track 44. In this example, the modulation has a period that is 32 times the fine track period, and the amplitude of modulation (marked "Ampl" in FIG. 5) is, for example, approximately 0.25 millimeters. The modulation function is preferably a sinusoid. Also, the amplitude is preferably less than 50% of the cross-track dimension of fine track 44 to limit interference with the operation of the fine track 44. In operation, light from the VCSEL illuminates scale 14 and is reflectively diffracted by fine track 44. The light reaching the scale 14 at the modulated edge of fine track 44 is diffracted in a complex two-dimensional pattern that, to first order, retains the sinusoidal modulation of the edge of the fine track 44.

Figure 6:
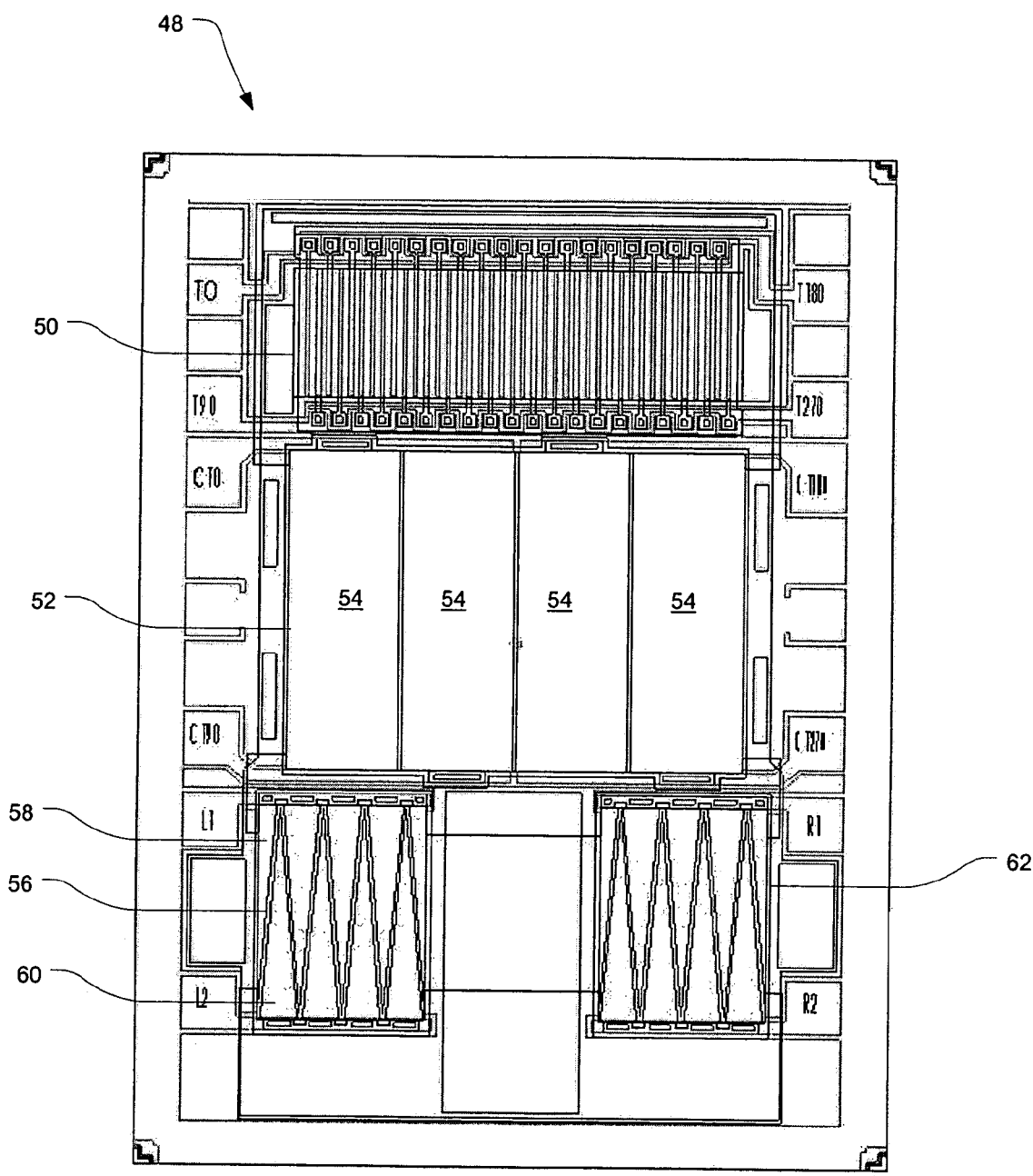
FIG. 6 is a diagram of a first multiple-element detector usable in the optical encoder of FIG. 1.

Referring to FIG. 6, a detector substrate 48 housed within the sensor apparatus 10 includes several photodetectors used in conjunction with the tracks shown in FIG. 5. The light diffracted by the central portion of the fine track 44 is sensed by a fine track detector array 50, which is an interdigitated, four-phase array detector. Pads labeled "T0", "T90", "T180", and "T270" make connections with respective sets of detector elements that correspond to phases 0, 90, 180 and 270 of a period of the detected fringe pattern.

The light diffracted by the first coarse track 42 (FIG. 5) is sensed by a coarse track detector array 52, which is a four-bin array having four quarter-cycle wide photodetectors 54 arrayed side by side. It will be recalled that the period of the first coarse track 42 is 640 microns for example. Because there is a diverging cone of light from the VCSEL source, the intensity pattern reaching the sensor apparatus 10 may have a spatial scaling factor of two. In such an embodiment, then, each quarter-cycle photodetector 54 is preferably 320 microns wide in the along-track dimension, and has a cross-track dimension more than twice the amplitude of the modulation function to allow for cross-track misalignment. In the illustrated embodiment, the modulation amplitude is 100 microns, and the photodetectors 54 are approximately 900 microns in the cross-track dimension, where again there is a factor of two to account for the magnification of the diverging cone of light.

These wide detectors 54 average out the high frequency variations in the complex diffraction pattern and produce a signal that approximates the sinusoidal edge modulation that constitutes track 42. Preferably, the detector width is a multiple of the fine track period to minimize modulation at the fine track period. The four coarse track detectors 54 together produce two quadrature signals that can be processed using well known algorithms to produce the relative phase of the sinusoidal edge modulation.

Subencoder 3: A third coarse track subencoder includes a second coarse track 40 (FIG. 5), a VCSEL or LED source, and a quadrature detector array. The track 40 is called a sloped grating track, and includes an alternating array of reflecting and non-reflecting regions. The array forms a periodic pattern that appears as sloped stripes with a 50:50 duty cycle. The pattern is characterized by its period $\lambda$ (lambda) in the along-track direction, and the stripes' cross-track thickness T. The stripes are truncated at each end in the cross-track dimension, and thus have a generally parallelogram shape. The pattern may also be characterized by the slope S of each stripe segment, which is equal to $2\ T/\lambda$. In one embodiment, the track thickness T is 100 microns and the period X is 32 times the period of the first coarse track 42. In the illustrated case, this period is 20.48 millimeters.

FIG. 5 also illustrates additional examples of this type of coarse track. A third coarse track 38 has a period of 655.360 millimeters, and a fourth coarse track 36 has a 20.97152 meter period. Many encoder applications do not require such a long range, and therefore in such applications it may be possible to reduce the period and slope of the fourth coarse track or dispense with a fourth coarse track altogether. More generally, for any given application, the number of coarse tracks and their respective periods and slopes are selected as needed.

Figure 7:
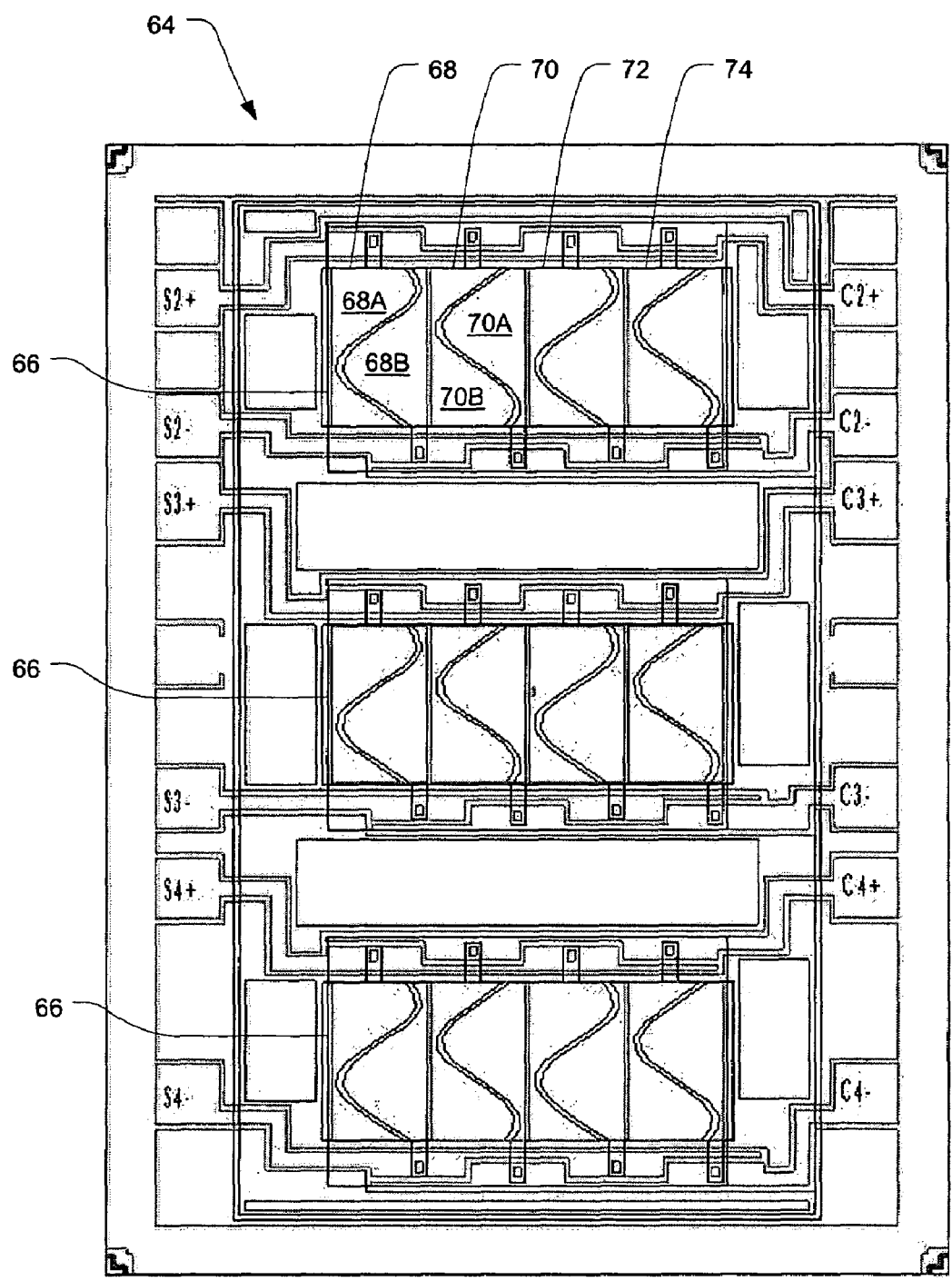
FIG. 7 is a diagram of a second multiple-element detector usable in the optical encoder of FIG. 1.

FIG. 7 illustrates a second detector substrate 64 also housed within the sensor apparatus 10 that contains three detector arrays and is used in conjunction with the sloped grating tracks 40, 38 and 36 to form the respective subencoders. The preferred array is a quadrature shaped detector (QSD) array 66. The QSD array includes at least one sine shaped detector 68 and one cosine shaped detector 70. The sine shaped detector 68 includes an area photodetector 68A whose sensing area is modulated by at least one cycle of a sinusoid. Preferably, as illustrated in FIG. 7, sine shaped detector 68 further includes a second area photodetector 68B whose sensing area is modulated by a sinusoid that is out of phase with respect to the modulating sinusoid of photodetector 68A by a half cycle. The cosine shaped detector 70 is identical to sine shaped photodetector 68 except for the phase of the modulating sinusoid(s); the modulating sinusoids are shifted by $0.5\pi$ with respect to the sine shaped detector 68.

The area photodetectors 68A, 68B are modulated in the cross-track direction, and the period of the modulating sinusoids is proportional to the cross-track dimension T of the corresponding sloped grating. In the illustrated embodiment, the modulation period is equal to 4 T. One factor of 2 accounts for the optical scaling due to the expanding cone of light, and the other factor of 2 accounts for the 50:50 duty cycle of the pattern.

In operation, the light from the LED or VCSEL illuminates a given coarse track 36, 38 or 40. The light reflected from the track, at a distance of about 5.2 millimeters in a typical embodiment, forms a pattern of dark and bright regions similar in geometry to the track pattern itself, scaled by a factor determined by the geometry of the expanding cone of light (typically a factor of 2 when the source and detector array are in a common detection assembly). Along-track motion of these sloped light stripes, when detected in a narrow, cross-track window, appears as a slower cross-track motion of the light pattern.

When a stripe of light produced by the sloped grating is swept across either shaped photodetector (e.g. 68A/68B) at a constant speed, the photodetector generates a sinusoidally varying output signal. As with the detectors described above, the complementary photodetectors (e.g. 68 and 70) can be operated differentially to produce a sinusoidal output signal having little or no bias offset. Because of their geometry, the signals produced by shaped detectors 68 and 70 are always $0.5\pi$ shifted in phase.

As illustrated in FIG. 7, the QSD 66 may include additional pairs of shaped photodetectors, illustrated as detectors 72, 74, to increase the signal strength and provide averaging to reduce signal errors. The width of these additional detectors is small relative to the period of the sloped gratings with which they are used. For example, QSD 66 is typically 1000 microns wide while the period of the stripes produced by the second coarse grating 40 is 40,000 microns in the plane of the detector. Thus, the slight phase shift introduced between pairs of detectors by spreading them out in the along-track direction is negligible.

Figure 8:
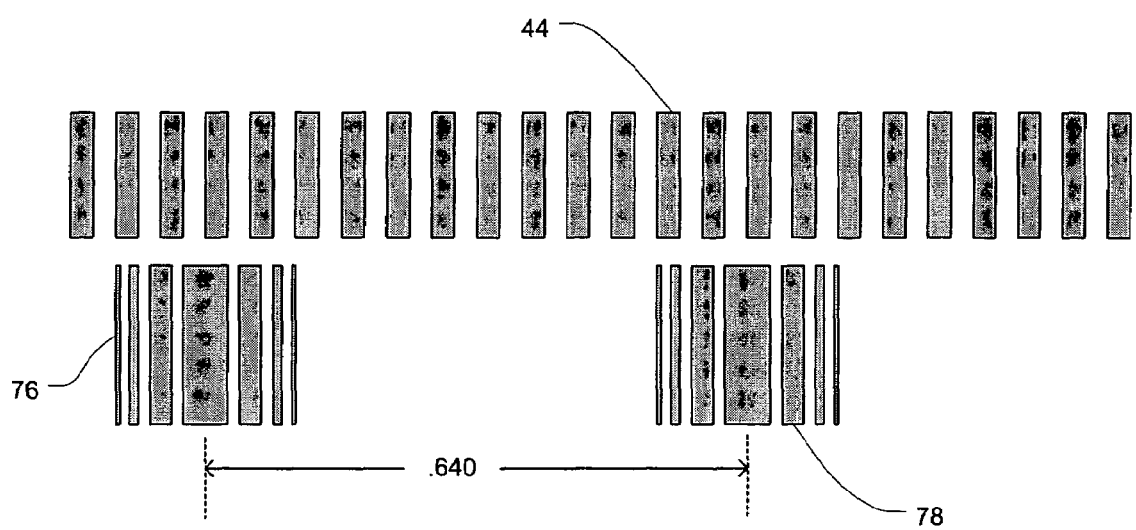
FIG. 8 is a diagram of an alternative multiple-track scale usable in the optical encoder of FIG. 1.

Subencoder 4: This subencoder embodiment includes a "repeated index track", a spatially coherent light source, and a suitable index mark detector. FIG. 8 illustrates schematically the fine track 44 and a repeated index track 76. The repeated index track 76 consists of a periodic array of diffractive optical elements (DOEs) 78, each DOE being in the form of a short focus cylindrical lens. As illustrated, the non-powered axis of each DOE 78 is parallel to the cross-track direction. Each DOE 78 thus creates a focused (or partially focused) line of light that travels in the along-track direction as the DOE itself moves with the scale 14. The track 76 is called a repeated index track because a single DOE 78 can function as an index mark in incremental encoders.

Figure 9:
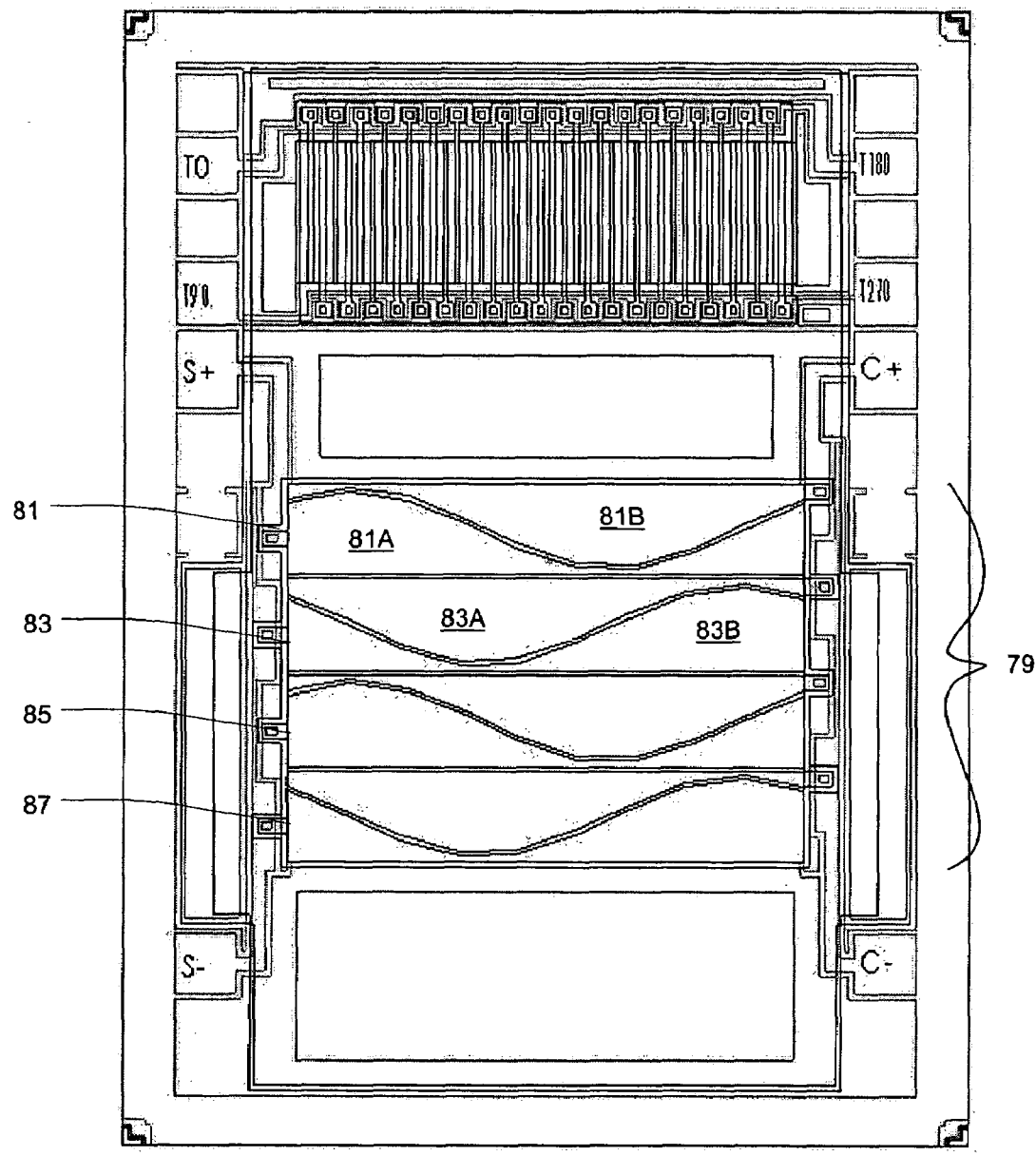
FIG. 9 is a diagram of a multiple-element detector usable with the scale of FIG. 8.

The repeated index track 76 is preferably used with a multi-element detector having a sinusoidally varying response in the along-track direction, such as the QSD detector array 79 shown in FIG. 9. The detector array 79 includes at least two detectors 81 and 83, each having two complementary elements (81A, 81B) and (83A, 83B) having a cross-track dimension that varies sinusoidally. The detectors 81 and 83 are offset from each other by ¼ of a cycle in the along-track direction. As the track 76 and a focused line of light from an element 78 move at constant speed with respect to the detector array 79, each detector element outputs a sinusoidally varying signal, with the respective signals from detectors 81 and 83 being offset from each other by 90 degrees. As shown, the detector array 79 may include additional pairs of detectors such as detectors 85 and 87.

Subencoder 5: Another coarse track subencoder uses a track 80 shown in FIG. 10. This coarse track 80 is a simple 50:50 duty cycle grating, approximately 32 times more coarse than fine track 44. In the illustrated example, the coarse track 80 has a period of 640 microns. This track is also preferably used with a sinusoidal detector such as the detector array 79 of FIG. 9.

Figure 11:
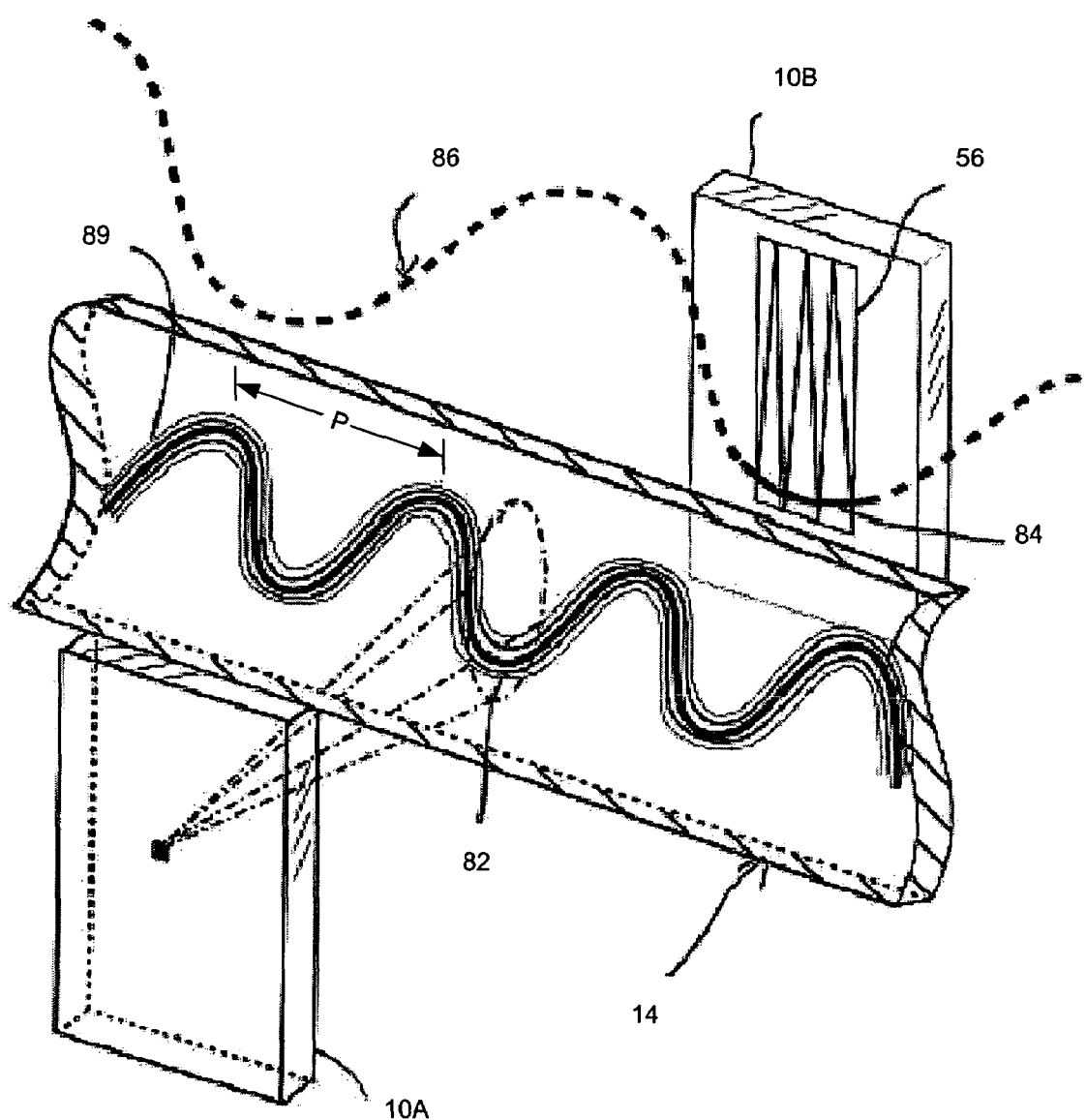
FIG. 11 is a diagram illustrating an optical encoder employing a grating with a sinuous pattern.

Subencoder 6: Yet another embodiment of a coarse track subencoder utilizes a sinuous cylindrical lens to convert along-track scale displacement into a measurable cross-track light stripe displacement. FIG. 11 is a schematic illustration of this subencoder. The subencoder is shown operating in transmissive mode for clarity, and the scale 14 has been anamorphically distorted to illustrate multiple sinuous cycles. The scale 14 includes a sinuous cylindrical lens DOE 89 extending the full length of the scale 14. The axis of the lens is sinuous; that is, the axis of the lens is not a straight line parallel to the along-track direction, but rather is a sinusoidal curve extending in the along-track direction.

In operation as a coarse track, a portion 82 of the sinuous cylindrical DOE lens 89 is illuminated by a spatially coherent source in a source assembly 14A in the illustrated transmissive configuration. The illuminated portion 82 is short compared to the period, P, of the sinuous function. Again it should be noted that in FIG. 11 the scale 14 and therefore the DOE 89 have been anamorphically distorted to make the period P appear much shorter than actual. On an actual scale, the illuminated portion 82 appears generally horizontal.

The illuminated portion 82 of the DOE cylindrical lens 89 forms a line image 84 of the source on a detector 56 in the detector assembly 10B, the focal length of the DOE 89 having been designed to perform approximate 1:1 imaging at a source distance equal to the scale-to-detector assembly separation. The line image approximates a line segment whose length is proportional to the length of the illuminated region 82. The line segment is generally parallel to the along-track direction and has a cross-track position proportional to the cross-track displacement of the axis of the DOE 89, which naturally sweeps back and forth in the Y direction as the X position of the scale 14 changes. FIG. 11 illustrates with a dotted line 86 the image that is created when the corresponding portions of the extended, sinuous cylindrical lens DOE 89 are located in the region of illumination. Of course, the line image 86 is a direct mapping of the sinuous DOE 89. Thus, as the scale moves in the along-track direction, the line segment sweeps back and forth in the cross-track direction.

This subencoder uses a line tracking detector configuration to estimate the cross-track position of the focused line segment. The QSD 66 of FIG. 7 is suitable, as is a shark-stooth shaped detector (SSD) 56 such as illustrated in FIG. 6. The SSD 56 includes two sets of complementary triangular photosensitive regions 58 and 60. Typically each triangle is elongated in the cross-track direction, and multiple triangular areas are arrayed next to each other in the along-track direction. The regions 58 and 60 are oriented in opposing directions and are positioned to form a single interdigitated SSD 56. In the signal processing for the SSD 56, the position estimate is proportional to the difference of the signals from positive regions 60 and negative regions 58, normalized by their sum.

In a subencoder using the elongated sinuous DOE 89, it is not feasible to perform quadrature sampling of the light pattern from the DOE 89 at a single location. Two alternative approaches may be used. A second DOE can be added that is offset from the first DOE 89 by one-quarter of a cycle, and these two DOEs can be sampled by corresponding detectors at a single point. Alternatively, a single DOE such as DOE 89 can be used with detectors separated by one-quarter of a cycle.

Other subencoders: Other coarse track subencoders may utilize other sensing technologies to produce sinusoidally varying signals. For example, magnets or magnet arrays may be used with magnetic sensors such as, for example, commercially available Hall effect sensors and sensor arrays.

Such subencoders can be combined with optical subencoders for a hybrid approach. This may be beneficial, for example, when optical subencoders are the best choice for the high resolution tracks, and magnetic methods are best for the coarse information. It is understood, however, that magnetic subencoders could be used for the high frequency tracks or in an all magnetic design.

Reference Track: Several of the incremental subencoders that can be used in the absolute encoder are designed to convert along-track scale motion into cross-track measurable signals. However, any cross-track scale motion will also appear as crosstalk error in these measurements. While a small degree of crosstalk may be tolerable is some applications, in many applications it is desirable to measure and compensate for this crosstalk error. The scale 14 in the preferred embodiment of the absolute encoder incorporates a reference track 46 (FIG. 5) to provide a measure of scale cross-track motion. This measure can be used in processor 20 to eliminate crosstalk error.

As shown in FIG. 5, in one embodiment the reference track 46 is an extended cylindrical DOE. The axis of the cylinder is oriented substantially parallel to the along-track direction and the DOE extends for the entire operational length of scale 14.

In operation, a portion of the extended cylindrical DOE lens 46 is illuminated by the spatially coherent source in sensor apparatus 10. That portion of the lens forms a line image of the source back on a detector in the sensor apparatus 10. The focal length of the DOE 46 is chosen to perform approximate 1:1 imaging at a source distance equal to the scale-to-detector assembly separation. The line image approximates a line segment whose length is proportional to the size of the illumination region. The line segment is substantially parallel to the along-track direction and has a cross-track position proportional to the cross-track displacement of scale 14 relative to sensor apparatus 10. Thus, any motions of the scale in the cross-track direction moves the line segment back and forth in the cross-track direction.

A line tracking detector configuration estimates the cross-track position of the focused line segment. Both the QSD 66, illustrated in FIG. 7, and the sharkstooth shaped detector (SSD) 56, illustrated in FIG. 6 are suitable detectors.

As has been mentioned, multiple incremental subencoders are combined with an electronic processor 20 that estimates the absolute position of the scale 14 based only on the immediately available incremental subencoder signals. The process that combines the incremental subencoder signals into a single encoder position word is called "linking." This process ensures that the encoder counts monotonically and that ultimately the accuracy of the encoder is dependent only on that of the finest subencoder track.

Tracks may be linked in pairs, starting with the linking between the highest frequency track and the next coarsest track. This operation produces a corrected coarse track, which is used for the linking to the next coarser track. This process can be cascaded as necessary to the very coarsest track, using the corrected result from each linking operation to perform the link to the next coarser track. The corrected information from each of the coarse tracks, when combined with the information from the finest track, produces the encoder's output position word.

Figure 12:
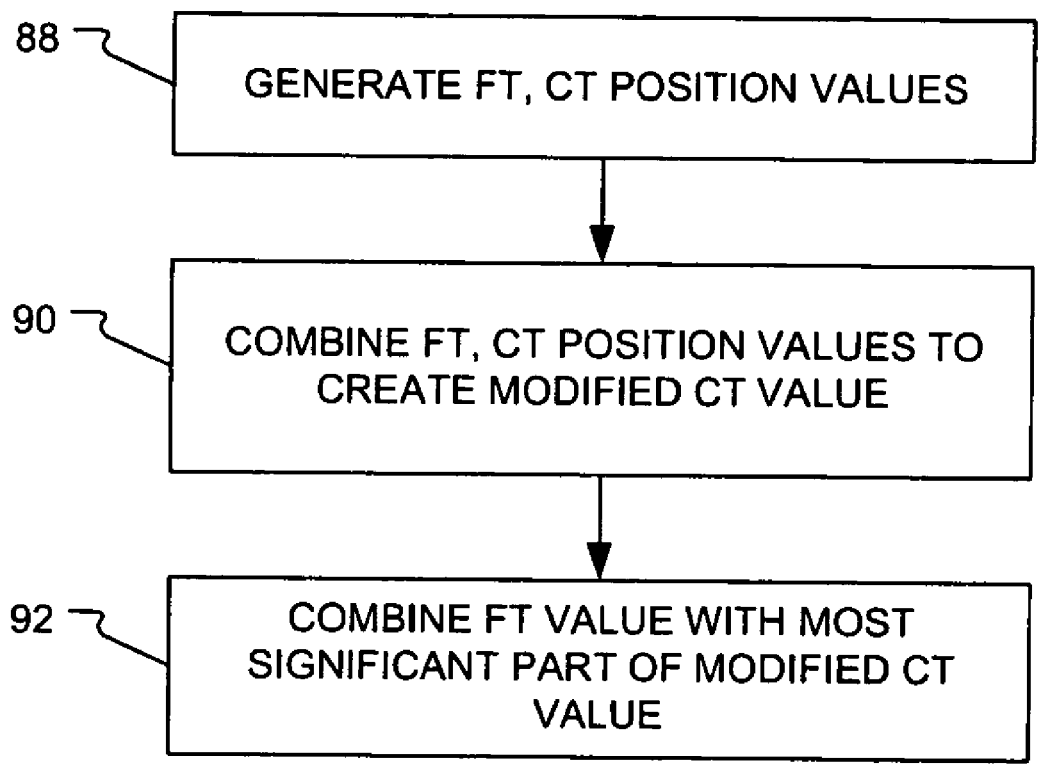
FIG. 12 is a flow diagram illustrating the general operation of a multiple-track absolute encoder such as the encoder of FIG. 1.

More specifically, FIG. 12 illustrates how linking is accomplished for a given pair of tracks. Although in FIG. 12 these tracks are referred to as FT and CT, it will be appreciated that the same process can be carried out on other pairs of tracks, such as pairs of coarse tracks CTn, or a physical track and the (mathematical) result of a previous iteration of linking, as well. In step 88, the position value is generated for each of the subencoders. Depending on the subencoding method, this may involve digitizing the sine and cosine signals and calculating the arctangent, as described above. Waveforms showing the position values as a function of encoder position are shown as FT and CT in FIG. 13. It will be observed that they form a quantized ramp or sawtooth function. The fine track FT has the relatively high frequency ramp function, and the coarse track CT has a lower frequency ramp. Fine-grain quantization is omitted from FIG. 13 for clarity.

Referring again to FIG. 12, in step 90 the calculated FT and CT position values are combined to create a modified CT value. The purpose of this combining is to create modified CT values that transition from one value to the next in phase and synchronism with the transitions of the FT values (thus transferring the accuracy of FT to CT). The merging generally involves scaling the CT value to account for its greater significance, algebraically combining the FT value and the scaled CT value, and filtering the result to effectively remove the original transitions of CT.

In step 92 the calculated FT value is combined with the most significant portion of the modified CT value to create a combined value that unambiguously represents the encoder position to the resolution of FT, modulo the period of CT.

Figure 13:
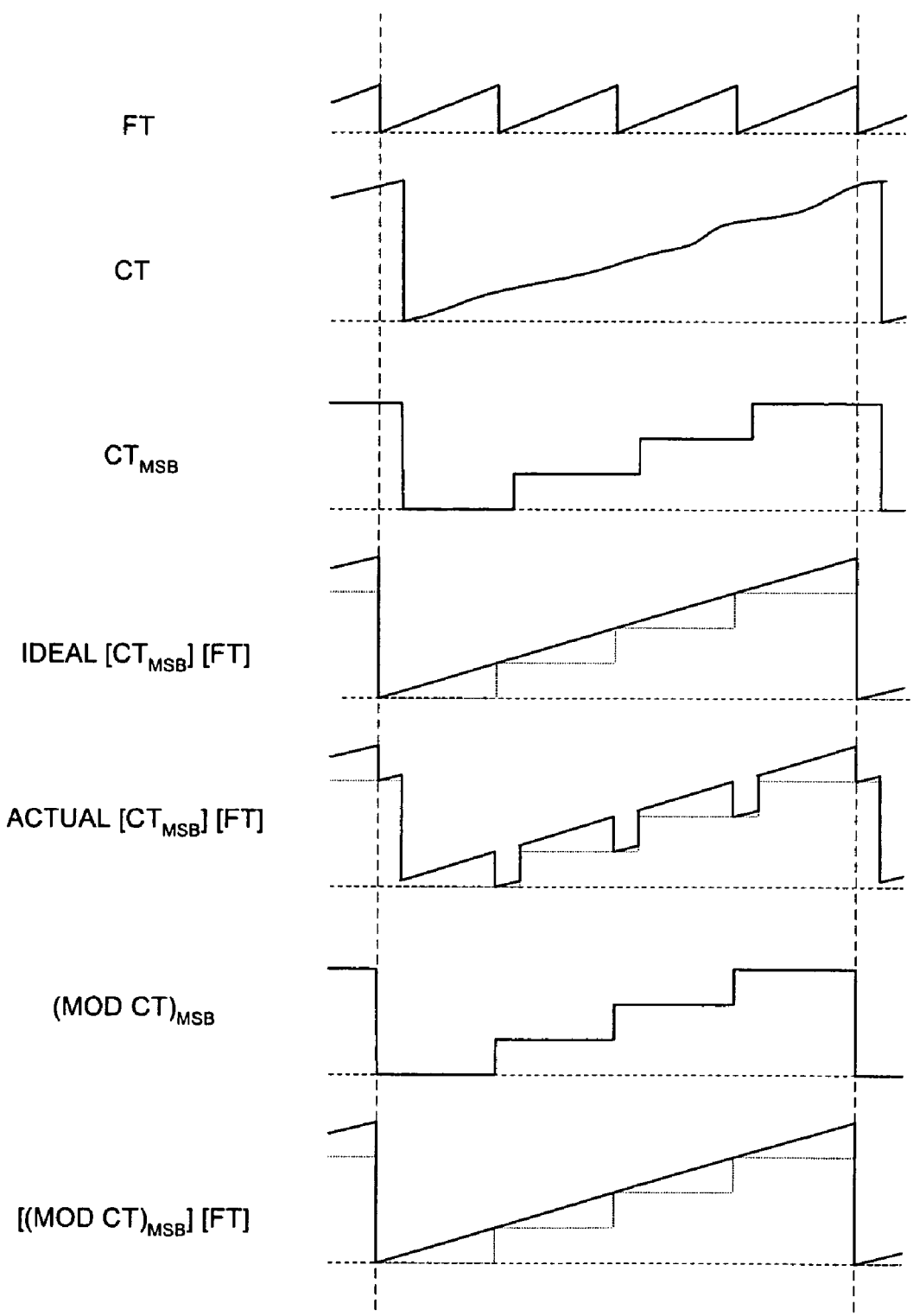
FIG. 13 is a waveform diagram showing waveforms of interest in an encoder employing multi-track linking as depicted in FIG. 12.

The operations of FIG. 12 are illustrated with reference to the waveforms of FIG. 13. For clarity, a simplified version is shown in which there are four periods of FT in each period of CT. In FIG. 13, the output of each track is shown as a ramp whose period is equal to the period of the track. Within each cycle, the phase (or position word) begins at zero and increases to a maximum value of $2^M-1$ at the end of the period, where M is the number of bits of interpolation resolution.

The interpolation resolution of CT is chosen such that the least significant part of each CT value "overlaps" with the most significant part of the FT values. That is, the overlapping parts represent nominally the same incremental position information. As described below, the number of overlapping bits is dictated in part by the amount of uncertainty in the phase relationship of the tracks. In FIG. 13, the most-significant, non-overlapping part of CT is shown as "$CT_{MSB}$". As shown, this most significant part of CT appears as a staircase with an indeterminate phase offset with respect to the FT cycle boundaries. If CT were perfectly aligned with FT such that all its bits transitioned in phase with corresponding bits of FT, then it would be a simple matter to concatenate the $CT_{MSB}$ value with the FT value to arrive at a full-resolution position value modulo the period of CT. The result of such a hypothetical operation is shown as "Ideal $[CT_{MSB}][FT]$" in FIG. 13. However, due to their random phase relationship, an actual combination of these values might appear as labeled "Actual $[CT_{MSB}][FT]$" in FIG. 13—it would have a periodic glitch in the vicinity of the FT period boundaries. Thus CT itself is not suitable for combining directly with FT.

For this reason, the modified CT values are created such that their most significant portion has sample-to-sample transitions in precise alignment with the cycle boundaries of FT, this being shown in FIG. 13 as "(Mod. $CT)_{MSB}$". When these values are added to the corresponding values of FT, the resulting position values increase monotonically modulo the period of CT and have the resolution of FT (shown in FIG. 13 as "[(MOD $CT)_{MSB}$] [FT]"). Specific examples are given below.

Figure 14:
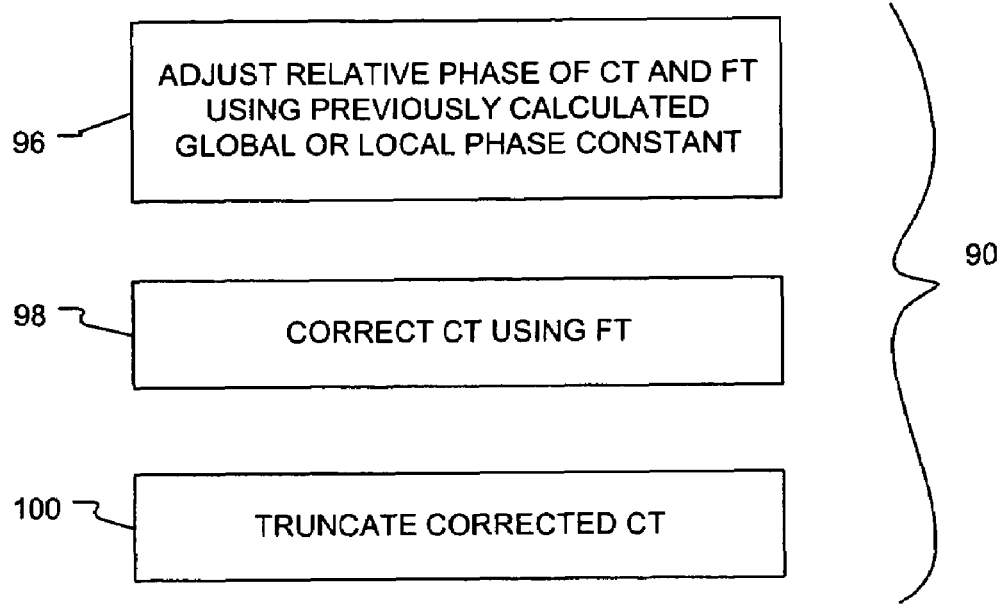
FIG. 14 is a flow diagram illustrating how position estimates are combined for multiple tracks in an absolute encoder such as the encoder of FIG. 1.

FIG. 14 shows the functions performed in combining step 90 of the process of FIG. 12. It is assumed that prior to this process, an average phase offset between the FT and the CT has been determined in a separate calibration operation. To determine this phase offset value, the total range of the scale 14 is traversed while the spacing between the coarse track transitions and the corresponding fine track transitions is monitored. This may be done by comparing the fine track MSB transitions with the transitions of the corresponding overlapping bit of the coarse track, and expressing the relative phase in terms of higher resolution fine track states. This calibration need only be performed at encoder initialization, not at each start up. Its purpose is to measure the average phase offset and store its value in non-volatile memory. As an alternative, the calibration run may be performed on only some sub-interval of the entire scale, if such sub-interval accurately reflects the average phase relationship between the two tracks.

Once the average phase offset between the ramps of the two tracks has been determined, in step 96 the relative phase between the coarse track and the fine track is adjusted based on the average phase offset from the calibration. The objective is to maximize the smallest separation between the fine track MSB transitions and the corresponding coarse track bit transitions. This leads to an alignment such that the start of the coarse track ramp occurs roughly mid-way through a fine track ramp. The phase adjustment can be effected by adding a phase adjustment value to each coarse track position value before further processing of the phase-adjusted coarse track position value, or by incorporating the phase adjustment in an intermediate "inverse fine track" value that is subsequently combined with the coarse track position value (as described below with reference to FIG. 16). As an alternative, differential sine and cosine coarse track signals could be mixed to result in a shift of the coarse track ramp signal.

Figure 16:
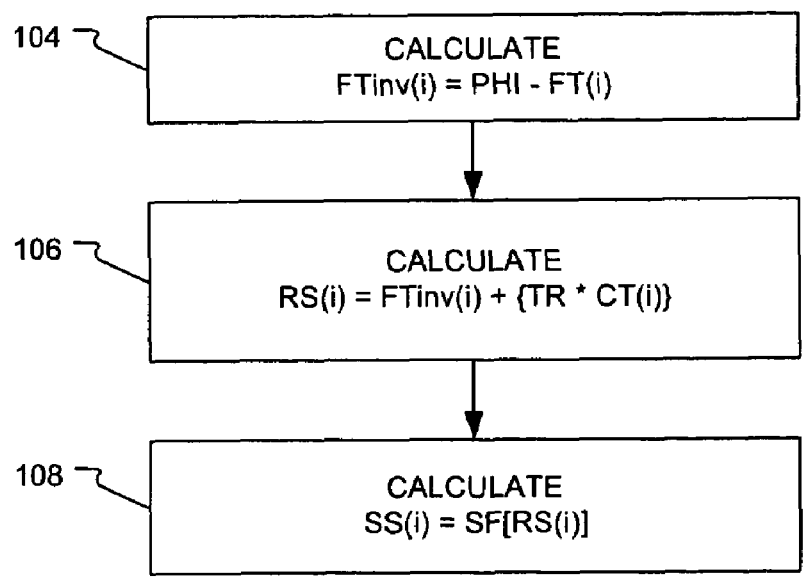
FIG. 16 is a flow diagram illustrating a specific implementation of the combining process of FIG. 14.

In step 98, the (potentially phase-adjusted) coarse track position value is corrected by a value determined by the fine track position value. One such correction is achieved by adding $(2\pi-F)/TR$ to the coarse track, where F is the value from the finer subencoder and TR is the ratio of the periods of the two tracks. In the approach of FIG. 16 described below, this is accomplished by adding the inverse fine track position value to the coarse track position value.

After the correction value is added to the coarse track position word, this word is truncated in step 100 by discarding the least significant bits that overlap with the fine track position word. Performing this operation generates the corrected coarse track information, shown as $(Mod\ CT)_{MSB}$ in FIG. 13. This corrected coarse track is then combined with the fine track bits in step 92 of FIG. 12. In one embodiment, these values are combined by concatenation. The resulting encoder position word gives the encoder position modulo the period of the coarse track.

In an encoder having a range beyond the maximum position value that can be attained with only two tracks, the position word from the above linking process can be linked with a next-coarser track(s) in a similar manner to yield a longer position word while retaining the precision of the fine track.

For robust linking between a given track and the next-higher-resolution track, it is generally necessary that the lower frequency track be interpolated to a resolution that is at least the same as the resolution of the higher frequency track MSB. Using this amount of overlap (which is referred to as "one linking bit") results in a coarse transition location tolerance range of +/-one-quarter of a fine track period. Interpolating the coarse track further improves the linking tolerance and permits lower accuracy coarse tracks and less accurate track-to-track phasing to be used. This relationship is given in Table 1 below, in which the notation "<->" means that the inter-track phase inaccuracy must be greater than the lower limit and less than the upper limit.

TABLE 1

| # of linking bits | Tolerance (fraction of fine track period) |
|---|---|
| 1 | $-\frac{1}{4}$ <-> $+\frac{1}{4}$ |
| 2 | $-\frac{1}{2}$ <-> $+\frac{1}{2}$ |
| 3 | $-\frac{3}{4}$ <-> $+\frac{3}{4}$ |
| ... | ... |
| L (>1) | $-(1 - 2^{-(L-1)})$ <-> $+(1 - 2^{-(L-1)})$ |

FIG. 15 shows a special case of the above algorithm in which only one linking bit is employed. The non-ideal phase shift and variability of the coarse subencoder output is shown at the top. The result of phase-shifting the coarse ramp is shown at the bottom, and the values of the coarse and fine linking bits are also shown.

A variation on the linking method involves a different way of handling the phase shifting. Instead of applying the phase shift constant to the coarse position word in step 96, the correction of step 98 can be modified by the phase constant determined during calibration. For example, when the start of the coarse track is phased with respect to the fine track by $\pi$ fine track radians, then the above correction of $(2\pi-F)/TR$ is appropriate; however, if the coarse track is phased by 0 fine track radians, then the algorithm would involve using $(\pi-F)/TR$ for fine track values less than $\pi$, and $(3\pi-F)/TR$ for fine track values greater than $\pi$. The general form of the correction is $MOD(\pi+PHI-F))/TR$ where PHI is equal to coarse-to-fine phasing.

Some encoder errors show up as phase or frequency modulation in the coarse track signals. As examples, radial or axial runout of radial code tracks can cause such errors; similar errors can arise in linear encoders for different reasons. These result in the phase of the coarse track varying with respect to the fine track throughout the travel range. With this variation, the measurement of phase during calibration results in the need to select an average phase shift which is a compromise over the travel range. As explained above, this average phase shift can either be used to globally shift the coarse track position output, or it can be used to determine the appropriate PHI for the alternative algorithm. In some cases, the use of an average PHI may be very adequate. However, the alignment and accuracy tolerance ranges could be extended by using a different PHI at different points along the scale. This could be accomplished through the use of a lookup table which is generated at the initial calibration run of the encoder. The position word of the coarsest track of the encoder would be the independent variable of the table, with the local PHI for the coarse track being linked as the dependent variable. In this case, it is not necessary to apply a global phase shift; but instead, a calibration scan would likely be used to create the lookup table. The size of the lookup table required is dependent on the spatial frequency of the low frequency error to be compensated for, and the desired improvement in tolerances.

Alternatively, the calibration scan can be used to create a more conventional lookup table to simply correct the coarse tracks and generate more accurate coarse track position word ramps for use in the linking process. In this case, the scale would be moved through its full range using the finest track in incremental mode. During that movement, the coarse position words would be compared against their expected values using the accumulated position word from the finest track as the reference. The expected values would be the dependent variable of the table, with the corresponding position word of some coarse track being used as the independent variable. The coarse track used for the independent variable could be the one being corrected or a lower frequency track, perhaps even the coarsest track; the selection of the track to use is dependent on the frequencies of the errors to be corrected.

FIG. 16 illustrates a specific implementation of the functions of FIG. 14. This description employs an index variable "i" to specifically indicate the discrete samples that are obtained of the signals representing the tracks FT and CT. In the description of this process below, reference is also made to the waveform diagrams of FIG. 17.

Figure 17:
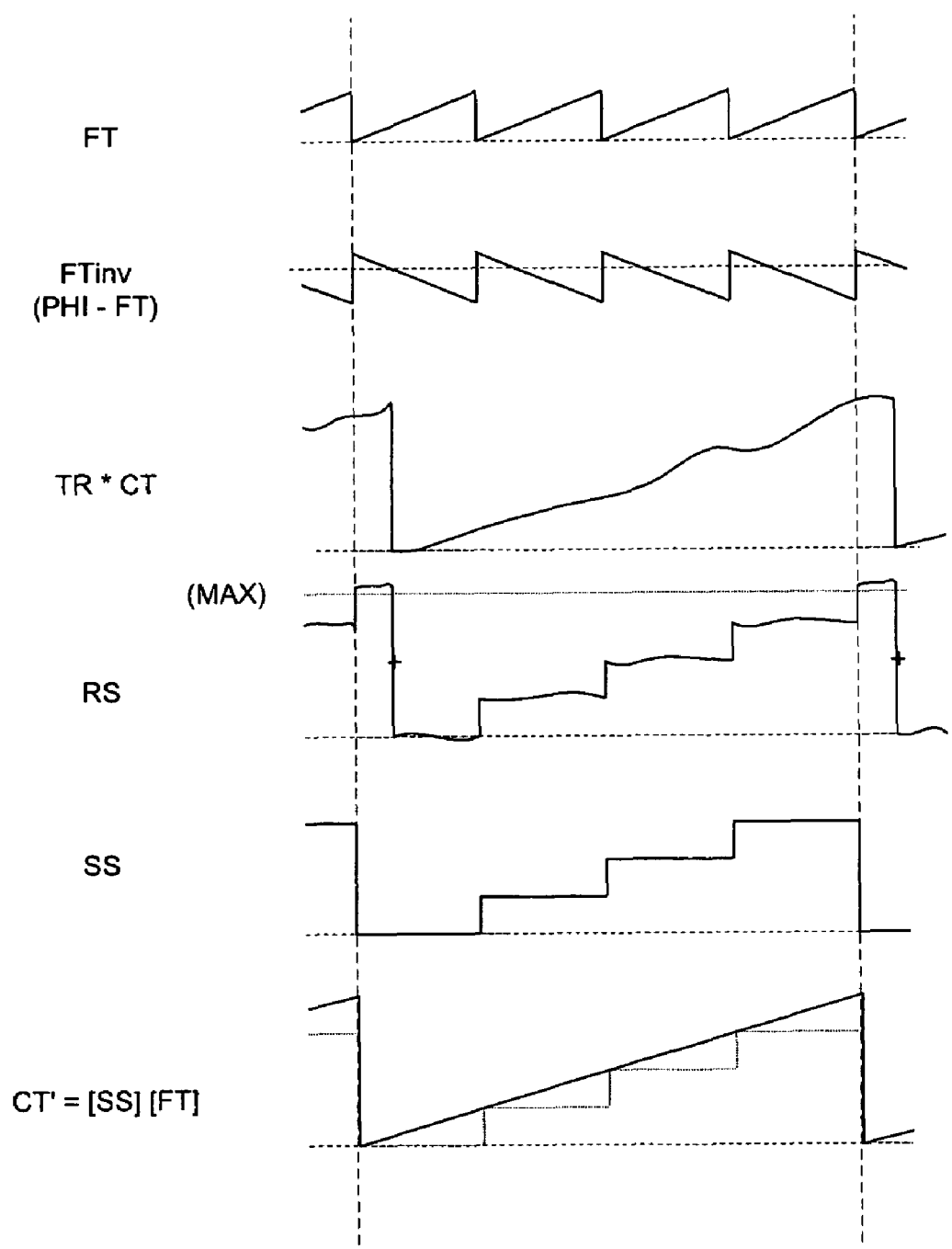
FIG. 17 is a waveform diagram showing waveforms of interest in an encoder employing the implementation of FIG. 16.

In step 104 of FIG. 16, the sample FT(i) is subtracted from a phase constant PHI, which may be calculated in a calibration operation in the same manner described above. The result of this subtraction is called FTinv(i). As can be seen in FIG. 17, the waveform for FTinv has the same period as FT, but within each period it slopes in the opposite direction.

In step 106, a value called "rough step" RS(i) is calculated by adding FTinv(i) to the sampled value of CT (denoted CT(i)) multiplied by the track ratio TR. The multiplication effects a scaling that is necessary to account for the greater period of CT on the scale. If the period of CT is 32 times greater than the period of FT, for example, then TR is equal to 32. The scaled CT is shown in FIG. 17 with the label TR*CT. As shown, it is a ramp having a period and amplitude of TR times the period and amplitude of FT. It will also be observed that this ramp is generally fairly noisy, i.e., it is not a smooth linear ramp, which is due in part to the scaling by TR that multiplies noise along with desired signal. The signal RS is also shown in FIG. 17. It has a generally staircase shape, with the transitions between steps occurring at the cycle boundaries of FT. However, due to the noise of TR*CT, the steps themselves are not flat, but rather contain some noise as well. As long as this noise is within an acceptable limit, it can be filtered out as discussed below to create a smooth staircase function that can be used as the upper bits of the linked position value.

It will be noted that in FIG. 17, the initial part of the RS waveform has an amplitude above a value labeled MAX, which is the maximum value that the sum of FT and (TR*CT) should be. This is a case of mathematical overflow—the amplitude in this region is a form of "wrap-around" that is dealt with in a subsequent processing step as described below.

In step 108 of FIG. 16, a value called "smooth step" SS(i) is calculated by applying a smoothing function SF to the value RS(i). Generally, SF must be such that it eliminates the noise on RS while preserving the locations of the step transitions. In one embodiment, SF may be realized by a set of ranges or brackets and a comparison function, as illustrated in Table 2 below. This SF effects the truncation of step 100 of FIG. 14.

TABLE 2

| Bracket | Operation |
|---|---|
| $0 \geq RS(i) > B_1$ | $SS(i) = 0$ |
| $B_1 \geq RS(i) > B_2$ | $SS(i) = B_1$ |
| $B_2 \geq RS(i) > B_3$ | $SS(i) = B_2$ |
| . | . |
| . | . |
| . | . |
| $B_{J-1} \geq RS(i) > B_J$ | $SS(i) = B_{J-1}$ |

The values $B_j$ in the above table are integer multiples of the number of samples in each period of FT. Thus if FT is interpolated to a depth of 10 bits, for example, then appropriate values for $\{B_j\}$ are $\{1024, 2048, \ldots\}$, and the number of brackets is equal to the track ratio TR.

In addition to the above brackets, the existence of an overflow or underflow condition is also detected and corrected. This is done by determining whether the value of RS(i) is greater than MAX or less than zero. When RS(i) is greater than MAX, it is replaced with (RS(i)−MAX) before the above bracketing is applied. Similarly, if the value of RS(i) is less than zero, it is replaced with (RS(i)+MAX) before the bracketing is applied. In FIG. 17, this process is responsible for moving the downward transition at the beginning of the smooth step (SS) waveform into alignment with corresponding transitions of FT and FTinv.

The resulting smooth step (SS) waveform is shown in FIG. 17. It has step transitions in the same locations as FT and FTinv. Unlike in RS, each step in SS is flat. It will be observed that the SS waveform is the same as the (Mod CT)$_{MSB}$ waveform of FIG. 13, and is likewise suitable to be concatenated with FT to form the linked position value. The result of such concatenation is shown in FIG. 17 as CT'.

As described above, an absolute encoder can be realized by employing a set of successively coarser tracks $CT_1$, $CT_2, \ldots, CT_N$ and repeatedly linking adjacent pairs of tracks until the full absolute position value has been calculated. It is also possible, in a manner described below, to achieve the same range and resolution in an encoder without the need for the very coarsest physical tracks. Such an approach has desirable benefits, including smaller scale size and avoiding sensing difficulties associated with very long-period grating patterns.

Figure 18:
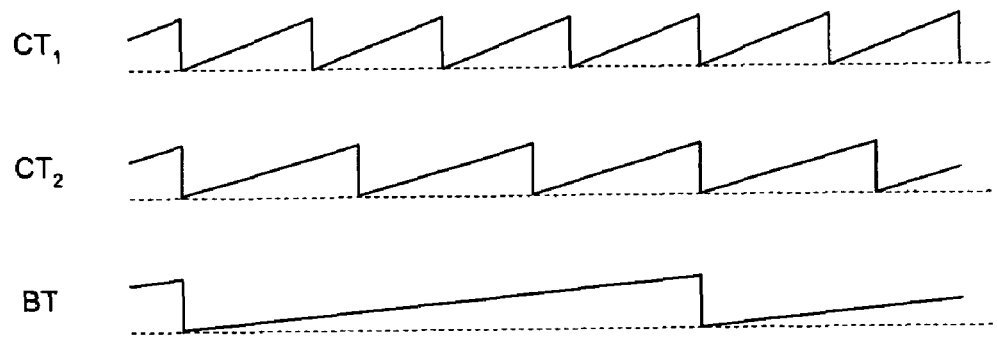
FIG. 18 is a waveform diagram illustrating the creation of beat signals that can be used in an absolute encoder such as the encoder of FIG. 1.

FIG. 18 illustrates the concept generally. Two coarse tracks having slightly unequal periods are formed on the scale 14. The signals from these two tracks are processed such that a mathematical track called a "beat track" BT is created within the processor 20. The period of BT can be selected to be much greater than, but precisely related to, the periods of $CT_1$ and $CT_2$. Moreover, the cycle boundaries of BT occur precisely with respect to $CT_1$ and $CT_2$ such that BT can be linked with either track to form a linked position word that gives absolute encoder position modulo the period of BT. Thus, a long-period coarse track can be realized without the need to actually include a physical long-period coarse track on the scale 14.

Figure 19:
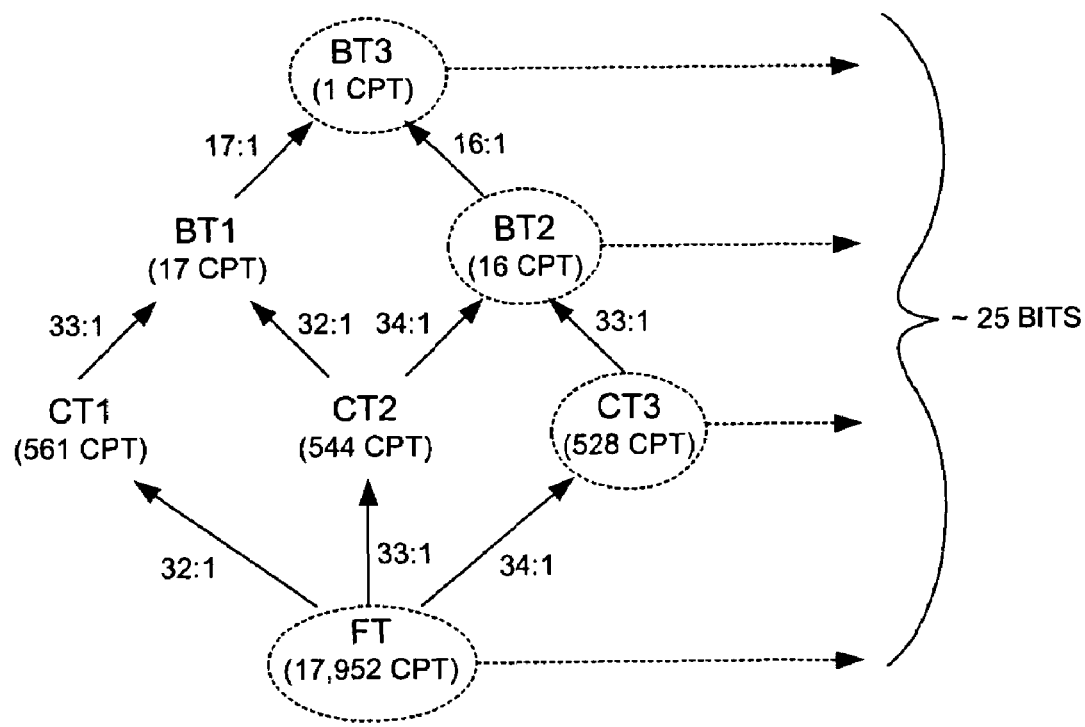
FIG. 19 is a diagram depicting the relationships among various physical grating tracks and beat tracks in one embodiment of an absolute encoder.

FIG. 19 depicts a scheme for generating a 25-bit absolute position value using one fine track, three similar-period coarse tracks and beat tracks. The fine track FT is interpolated to 10 bits, which form the least significant bits of the position word. Three coarse tracks $CT_1$, $CT_2$ and $CT_3$ having track ratios with FT of 32:1, 33:1 and 34:1 respectively are also formed on the scale 14. Each of these coarse tracks has a respective value denoted "cycles per turn" (CPT) associated with it. CPT is generally associated with rotary encoders, for which it represents the number of periods of the track over one revolution. With respect to linear encoders, the term CPT is used herein to represent the number of periods of the track over the entire length of the encoder. In the example of FIG. 19, these CPT values are 561, 544 and 528 respectively, which correspond to a linear scale length of about 36 cm. if the period of FT is 20 microns.

Tracks $CT_1$ and $CT_2$ are used to form a first beat track $BT_1$, and tracks $CT_2$ and $CT_3$ are used to form a second beat track $BT_2$. $BT_1$ has 17 cycles per turn, and it has track ratios of 33:1 and 32:1 with $CT_1$ and $CT_2$ respectively. $BT_2$ has 16 cycles per turn, and it has track ratios of 34:1 and 33:1 with $CT_2$ and $CT_3$ respectively. Tracks $BT_1$ and $BT_2$ are used to form a third beat track $BT_3$, which has 1 cycle per turn and track ratios of 17:1 and 16:1 with $BT_1$ and $BT_2$ respectively.

The final position word has components of tracks FT, CT3, BT2 and BT3 (shown encircled). In the assumed case of a 20-micron FT period, this position word represents a position over a 36 cm. range to a resolution of approximately 20 nm. It should be noted that other combinations of the various tracks may be used, such as (FT, CT2, BT1 and BT3).

Figure 20:
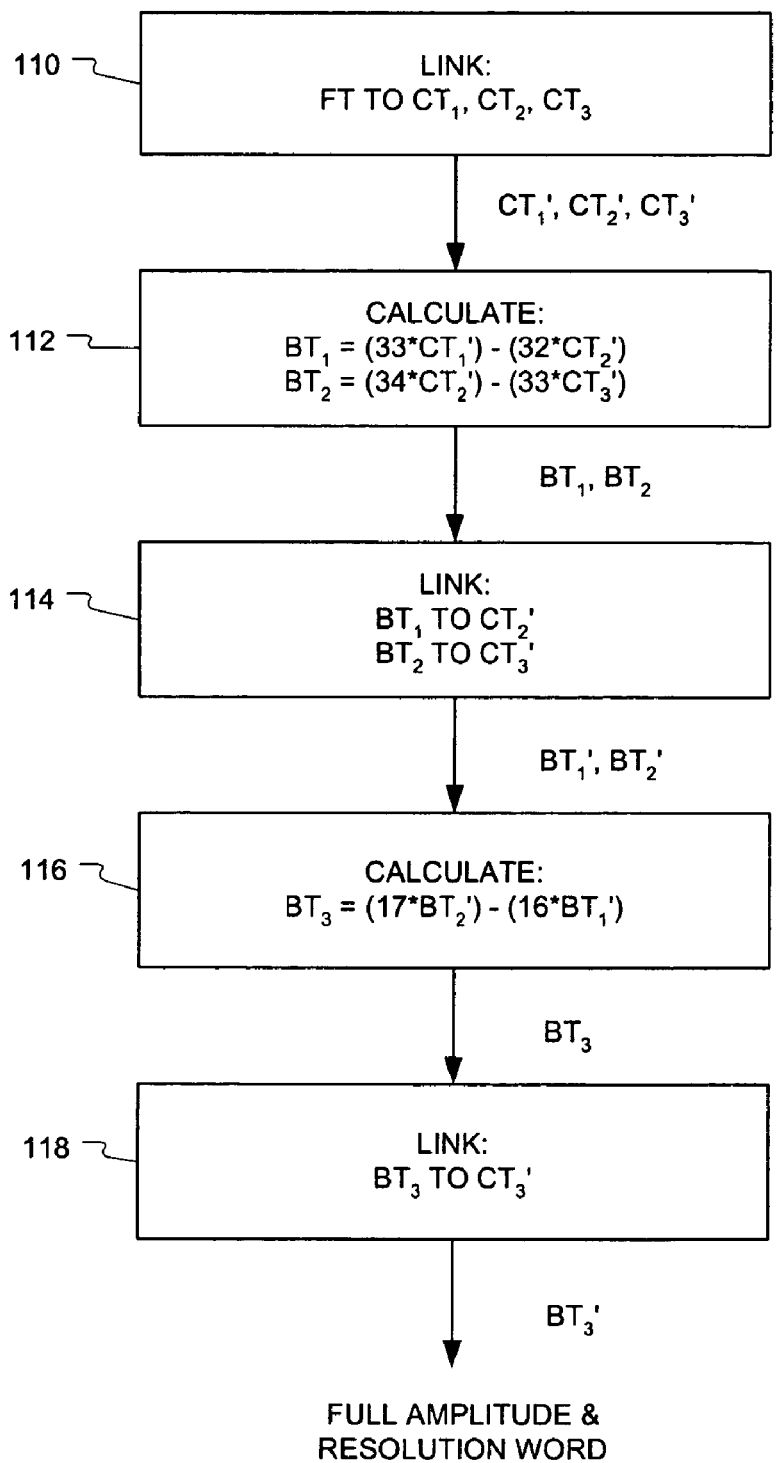
FIG. 20 is a flow diagram illustrating a process for realizing beat tracks in the scheme of FIG. 19 and a final resulting position indication.

FIG. 20 illustrates a process for realizing the scheme of FIG. 19. In step 110, the fine track FT is linked to each of $CT_1$, $CT_2$ and $CT_3$, using for example one of the above-described linking procedures. Out of this process come intermediate linked tracks $CT_1'$, $CT_2'$ and $CT_3'$.

In step 112, the beat tracks $BT_1$ and $BT_2$ are calculated as follows:

$$BT_1 = (33*CT_1') - (32*CT_2')$$

$$BT_2 = (34*CT_2') - (33*CT_3')$$

The scaling of the operands in the above calculations should be noted. This achieves two important goals. First, it imparts the proper amplitude to the beat tracks. It also avoids an undesirable cancellation of the FT component, which is common to $CT_1'$ and $CT_2'$. If these tracks were to be subtracted directly, the FT component would be cancelled out, removing the important FT timing information from the new beat tracks. Such cancellation is avoided when the values of $CT_1'$ and $CT_2'$ are scaled before performing the subtraction.

In step 114, linked beat tracks $BT_1'$ and $BT_2'$ are created by linking $BT_1$ and $BT_2$ with linked coarse tracks $CT_2'$ and $CT_3'$ respectively.

In step 116, beat track $BT_3$ is calculated as follows:

$$BT_3 = (17*BT_2') - (16*BT_1')$$

In step 118, linked beat track $BT_3'$ is created by linking $BT_3$ with $CT_3'$. $BT_3'$ is the full resolution, one CPT waveform.

Because of its "bottom-up" approach to creating the full resolution beat track $BT_3'$, the process of FIG. 20 can be referred to as "bootstrapping". It will be noted that at each level, the beat tracks are linked to a next-lower-level track before being used to create other beat tracks. Specifically, both $BT_1$ and $BT_2$ are linked to $CT_2'$ and $CT_3'$ respectively to create $BT_1'$ and $BT_2'$, which are then beat together to form $BT_3$. This bootstrapping approach provides a certain degree of robustness that enables the encoder to provide accurate position estimates even if the signal quality for one or more of the physical tracks (e.g. one of the coarse tracks $CT_1$-$CT_3$) is degraded. It is possible to omit this intermediate linking process in alternative embodiments. That is, unlinked first-level beat tracks such as $BT_1$ and $BT_2$ (rather than linked tracks $BT_1'$ and $BT_2'$) can be used to create second-level beat tracks such as $BT_3$. This is possible because the first-level beat tracks are themselves formed from linked tracks (e.g. $CT_1'$-$CT_3'$), and thus already include the accuracy and resolution of FT.

Such a modified process has the benefit of requiring fewer computations, and thus can contribute to improved system performance in certain respects. However, the performance of such a modified process may be somewhat more sensitive to degraded signals than the full bootstrapping approach of FIG. 20. This sensitivity can be ameliorated to some extent by careful selection of the track ratios. In the embodiment of FIG. 19, for example, it is beneficial that the ratios between the coarse tracks $CT_n$ and the first-level beat tracks ($BT_1$ and $BT_2$) are 32, 33 and 34—it is preferable that these ratios be about 32 or less. Also, it is beneficial that these same track ratios are close together. When the beat tracks $BT_1$ and $BT_2$ are created from the linked coarse tracks scaled by these track ratios (step 112), much of the scaled amplitude of the FT is subtracted out, so any errors present on FT are reduced accordingly.

Figure 21:
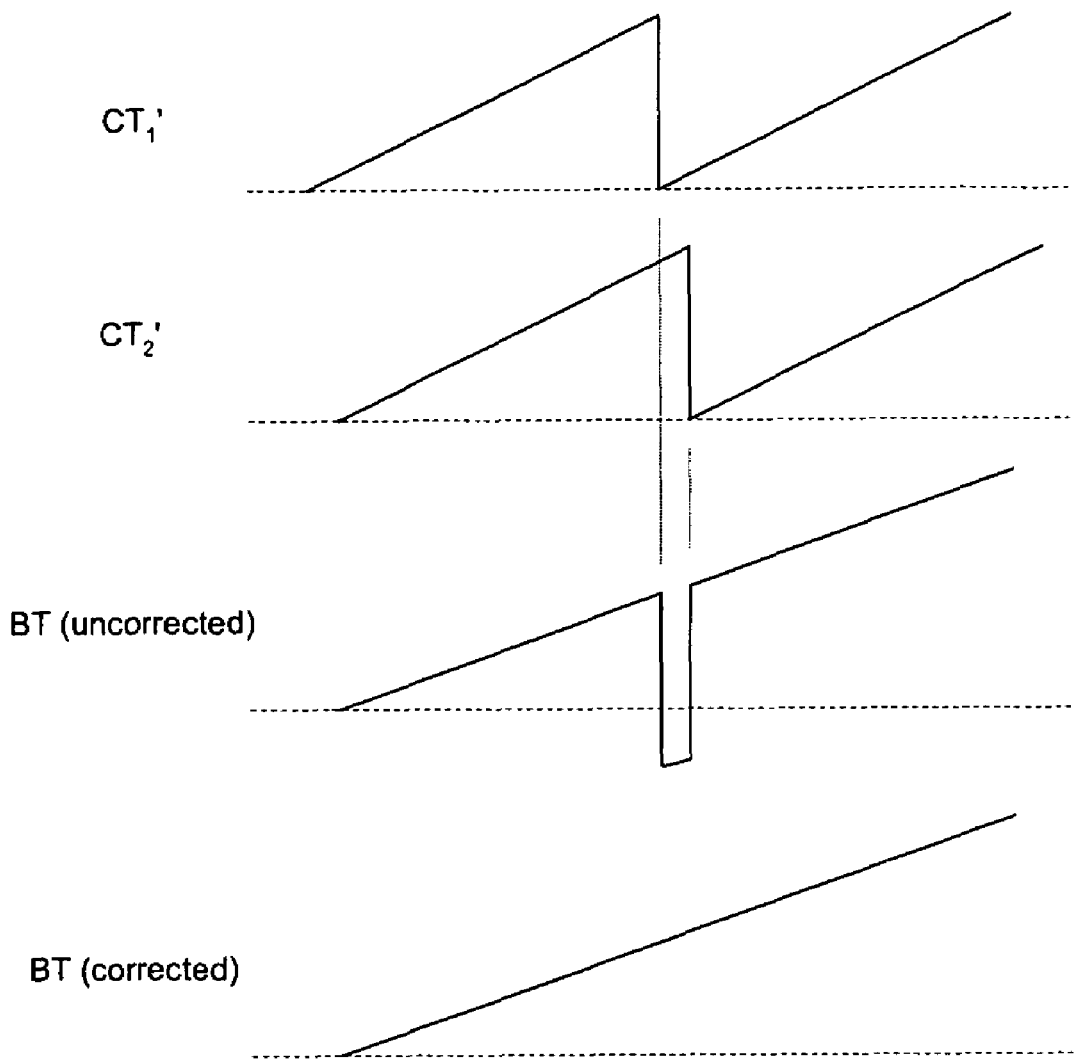
FIG. 21 is a waveform diagram showing how a rollover calculation condition is corrected in the process of FIG. 20.

FIG. 21 illustrates a situation that can arise in the calculation of the beat tracks. For example, in the calculation of beat track $B_1$, the result of the operation $(33*CT_1') - (32*CT_2')$ may be negative. This is shown as a downward glitch in FIG. 21. In this case, the negative value is corrected to a corresponding positive value by adding the maximum amplitude of $B_1$ to it. This correction takes the following specific form:

$$BT_1(i) = (33*CT_1') - (32*CT_2')$$

IF $BT_1(i) < 0$, then $$BT_1(i) = BT_1(i) + BT_1\max$$

End IF

In the illustrated example, $BT_1\max$ is 1,081,344, calculated as $(1024) \times (32) \times (33)$. The waveform for $BT_1$ as corrected is also shown in FIG. 21.

In the scheme of FIG. 19, all of the track ratios are integer values. It may be desirable in alternative embodiments to employ one or more coarse tracks CT that do not have an integer track ratio TR with the fine track FT. A given application of an encoder may have a requirement for a particular range and a particular resolution such that no set of suitable integer-multiple CTs can be found. In such an application it would be beneficial to permit non-integer track ratios so that finding a set of suitable CTs is possible. However, the linking approach as described above cannot be used to link track pairs having a non-integer track ratio. A modification of the approach is required and is described below.

Figure 22:
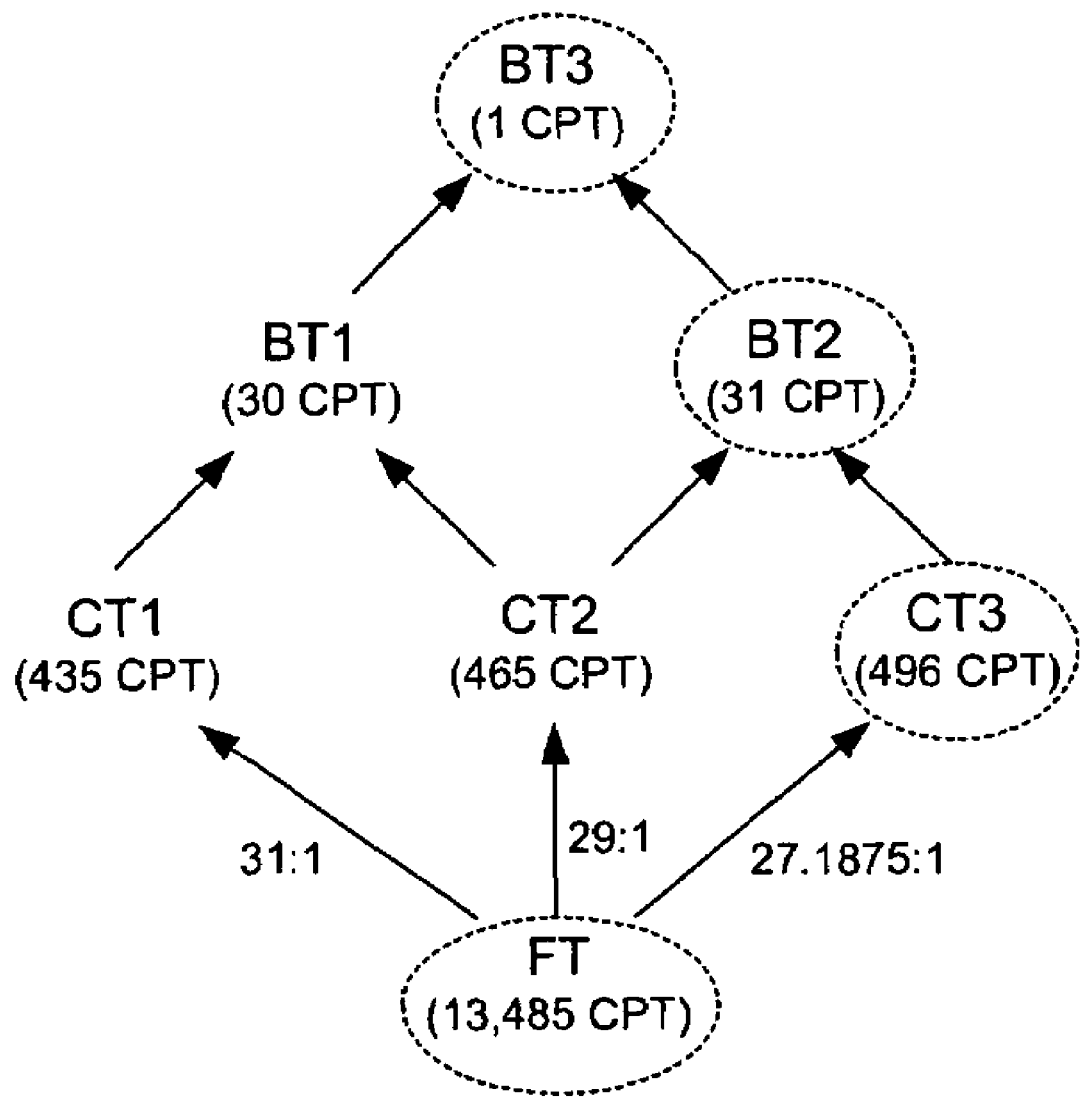
FIG. 22 is a diagram depicting the relationships among various physical grating tracks and beat tracks in another embodiment of an absolute encoder.

FIG. 22 illustrates an example of such an application. The range of the scale is 13,485 cycles of the fine track period, in contrast to the 17,952 cycles of the example of FIG. 19. Coarse tracks of 435 CPT, 465 CPT and 496 CPT are utilized, which have respective tack ratios with the fine track of 31:1, 29:1 and 27.1875:1.

Figure 23:
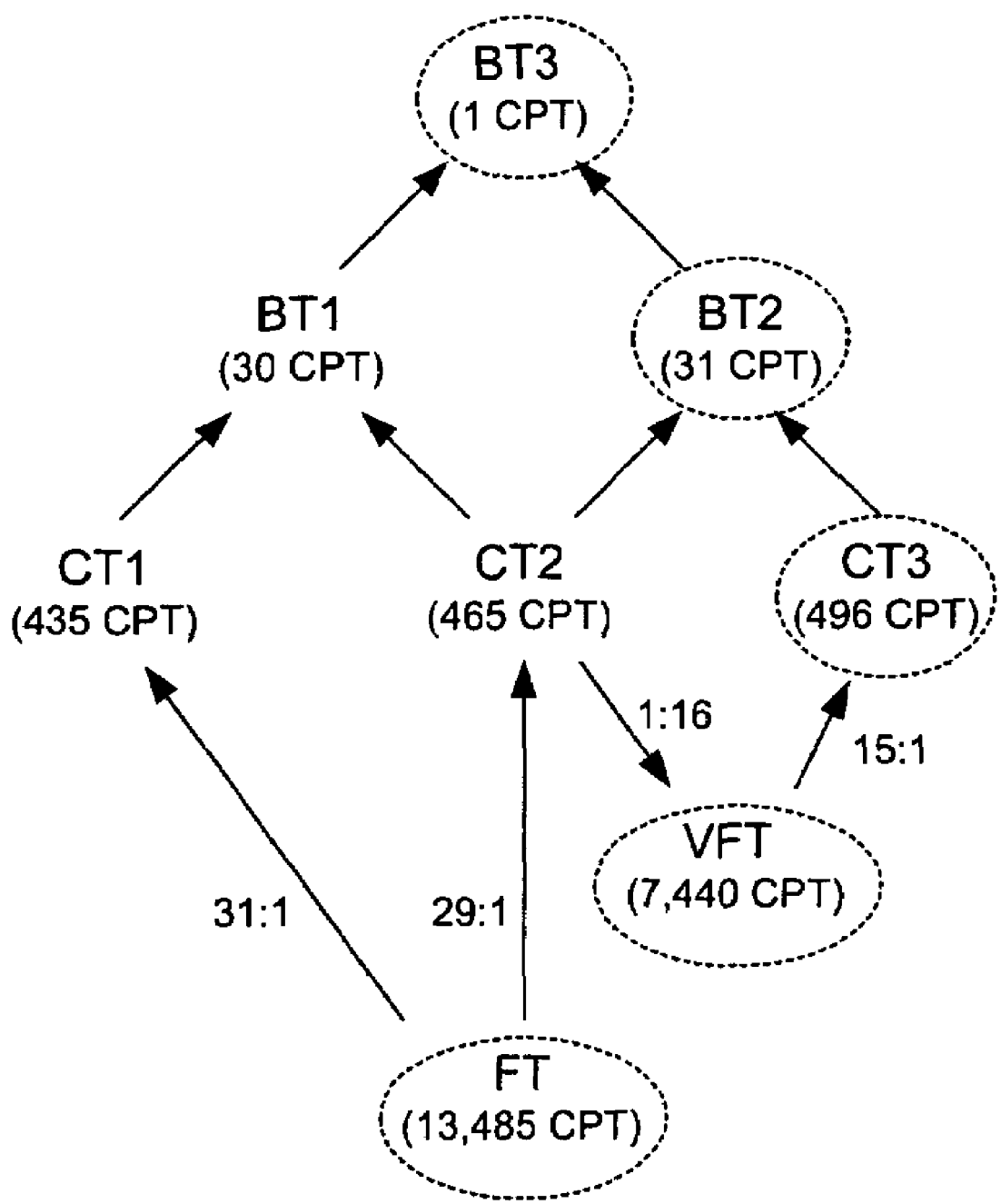
FIG. 23 is a diagram showing the use of virtual fine tracks in a scheme like that of FIG. 22 to realize a non-integer relationship between two tracks.

The method for linking CT3 to FT in this example is to employ a separate calculated track that is referred to as a "virtual fine track" or VFT, as illustrated in FIG. 23. The VFT has an integer relationship with both CT2 and CT3. In the particular example of FIG. 23, the VFT has 7,440 CPT and ratios of 16:1 and 15:1 with CT2 and CT3 respectively. The VFT is created by multiplying the linked signal $CT_2'$ by 16. Calculations for accomplishing such multiplication are known in the art. The resulting VFT has the integer ratio of 15:1 with $CT_3$ and can therefore be linked to it to form the linked signal $CT_3'$, which maintains all the timing information of FT while having a desirable non-integer period ratio with FT. Once the linked waveform $CT_3'$ has been formed as described above, the beat tracks B1, B2 and B3 and the corresponding linked waveforms can be created in the same manner as described in the previous example.

1) There may be variations of the above-described techniques pertaining to the use of linking, beat tracks, and virtual tracks. For example, a beat track may be created out of unlinked coarse tracks, and the fine track then links directly up to the beat track. Following the above example, this can be expressed as B17=CT1−CT2, and B17'=B17 linked with FT. In another alternative, a beat track can be formed from one linked coarse track and an unlinked coarse track, e.g. B17=CT1'−CT2, then B17'=B17 linked with either CT1' or FT.

A track such as FT can also be linked to a virtual track such as VFT. Additionally, a virtual track can be used with other tracks to create a beat track, whether the other tracks are linked, unlinked, or virtual.

Selection of Subencoders

In this section, selection criteria for the subencoders to be used to constitute an absolute encoder are presented. First, it is preferable that a single compact sensor apparatus 10 be used, and therefore all subencoders preferably operate with a common set of parameters. For example, all subencoders might have a scale-to-detection assembly distance of approximately 5 millimeters. Similarly, all subencoder detectors might have linear dimensions less than or equal to a predetermined maximum size such as 2 millimeters.

Additional considerations include the desired position resolution of the absolute encoder (typically on the order of 0.02 microns), the total desired measurement range (ranging up to 3 meters for example), and the expected fractional resolution of each subencoder candidate (that is, what fraction of a period can be resolved).

These multiple criteria may best be explained with reference to the exemplary encoder illustrated in FIG. 1, the set of tracks illustrated schematically in FIG. 5, and the detectors illustrated in FIGS. 6 and 7. The fine track 44 is a 20 micron period, square wave reflective grating. This grating is well suited for use in a Talbot interference encoder in which a VCSEL source is located on a common substrate with a fringe detector, with the common substrate located about 5 millimeters from the scale. This type of incremental encoder has been demonstrated to provide at least 0.02 micron resolution when used with an interdigitated, 4-bin detector such as detector 50.

If the absolute encoder has a total range of, say 0.65 meters (~650,000 microns), then the coarse track subencoders must, in combination, provide about 15 bits of range (that is, $2^{15} \approx 650000/20$). Since it is relatively easy to provide a track ratio of 32 (5 bits), it appears that three coarse subencoders providing 5-bits of range each will suffice (if the cascaded approach is utilized rather than the beat track approach, as is presumed in this example). Thus, coarse track 42 has a period of 640 microns (32×20 microns); coarse track 40 has a period of 20.48 millimeters (32×0.64 millimeters); and coarse track 38 has a period of 655.36 millimeters (32×20.48 millimeters).

Figure 10:
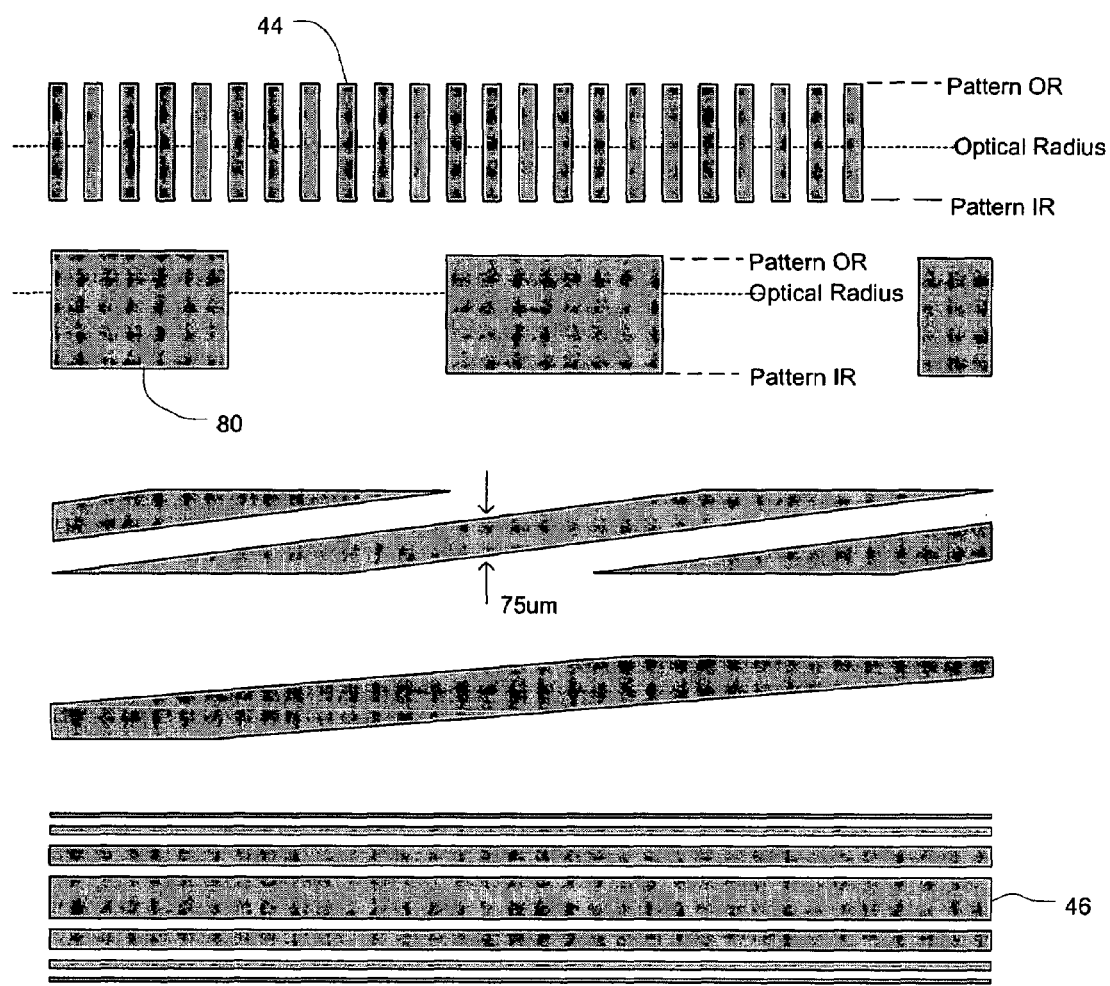
FIG. 10 is a diagram of yet another alternative multiple-track scale usable in the optical encoder of FIG. 1.

Coarse track 42 is formed by modulating the edge of fine track 44. Alternative tracks for the 640 micron period track are a repeated index track 76 (FIG. 8) or a coarse 50:50 duty cycle grating 80 (FIG. 10). Each of these tracks can be sensed by a detector such as detector array 79, and none of these tracks are sensitive to cross-track motion.

The second and third coarse tracks, track 40 and track 38, are both sloped grating tracks. This type of subencoder converts relatively long repeat periods (20.48 millimeters and 655.36 millimeters, for example), which are hard to detect with a small (~2 millimeter) detector, into motions which repeat over a much shorter distance (400 microns at the detector plane) and which are amenable to detection with a small detector. Tracks 40, 38 are matched with QSD arrays 66 each of which meets the 2 millimeter or smaller criterion.

The final track in this example is reference track 46, which is matched with SSD 56. Reference track 46 is included to correct for the cross-track sensitivity of track 40 and track 38.

In this example, an additional SSD 62 (see FIG. 6), is optionally included. The addition of a second SSD to measure the cross-track position of reference track 46 provides an angular alignment aid. That is, the two SSDs 56 and 62 will measure an identical cross-track position for reference track 46 when the sensor apparatus 10 is parallel to reference track 46.

Although the examples in the foregoing description have utilized fixed-point mathematics, in alternative embodiments it may be necessary or convenient to utilize floating-point mathematics instead. All the processes described herein can be implemented in an analogous fashion using floating-point calculations.

Also, while the above description focuses on optical encoders in particular, it will be appreciated that the presently disclosed techniques may be utilized in position encoders of other types, including for example electrical or magnetic position encoders.

Figure 24:
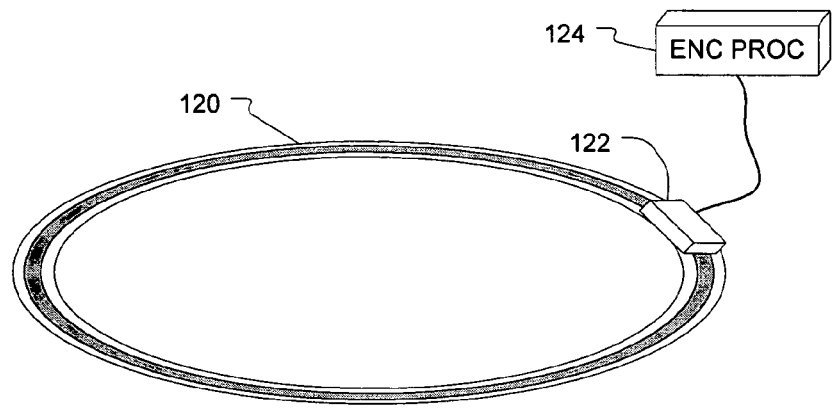
FIG. 24 is a diagram showing a rotary absolute encoder with annular scale, sensor head, and encoder processing electronics.
Figure 25:
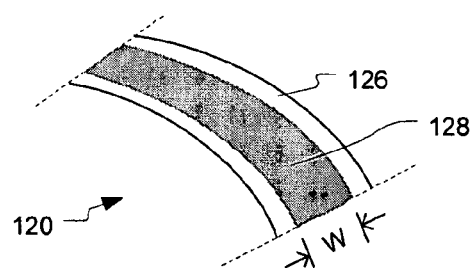
FIG. 25 is a close-up view of the encoder scale of FIG. 24.
Figure 26:
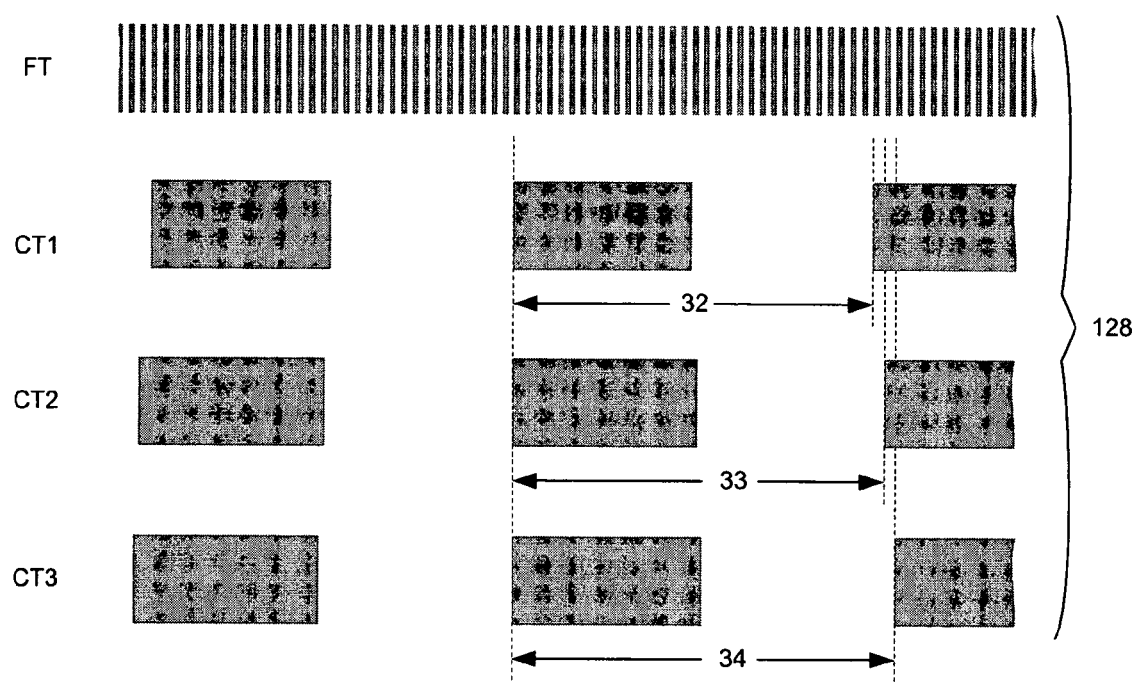
FIG. 26 is a diagram of a track area of the annular scale of FIGS. 24 and 25, with a fine track and three coarse tracks.

Turning now to FIG. 24, a rotary encoder that is particularly suitable for use on relatively large-diameter rotating shafts is shown. In the illustrated embodiment, the encoder includes an annular scale 120, a sensor 122, and encoder processing (ENC PROC) electronics 124. As shown in FIG. 25, the scale 120 has a substrate 126 with a track area 128 in which are formed multiple tracks that may be linked in the manner described herein. In particular, the track area 128 includes four physical tracks FT, CT1, CT2 and CT3 as shown in FIG. 26 to implement the general linking scheme depicted in FIG. 19 and discussed above, yielding greater than 24 bits of single turn resolution (18,382,848 counts per turn). The substrate 126 may be of any suitable material including glass and metal.

In one embodiment, the track area 128 with the four tracks FT, CT1, CT2, and CT3 has a radial width W of 5.03 mm. The ratio of the resolution (in bits) to the scale radial width W is approximately 5 bits/mm (4.79 precisely). More generally, the present technique can provide ratios of resolution to scale width of greater than 3 bits/mm.

The periods of the various physical tracks are as follows:
FT: 17,952 counts per turn with 20 micron period and 10 bit interpolation
CT1: 561 counts per turn (period ratio with FT of 32:1)
CT2: 544 counts per turn (period ratio with FT of 33:1)
CT3: 528 counts per turn (period ratio with FT of 34:1)
The linking algorithm described in connection with FIG. 19 above can be utilized.

Figure 27:
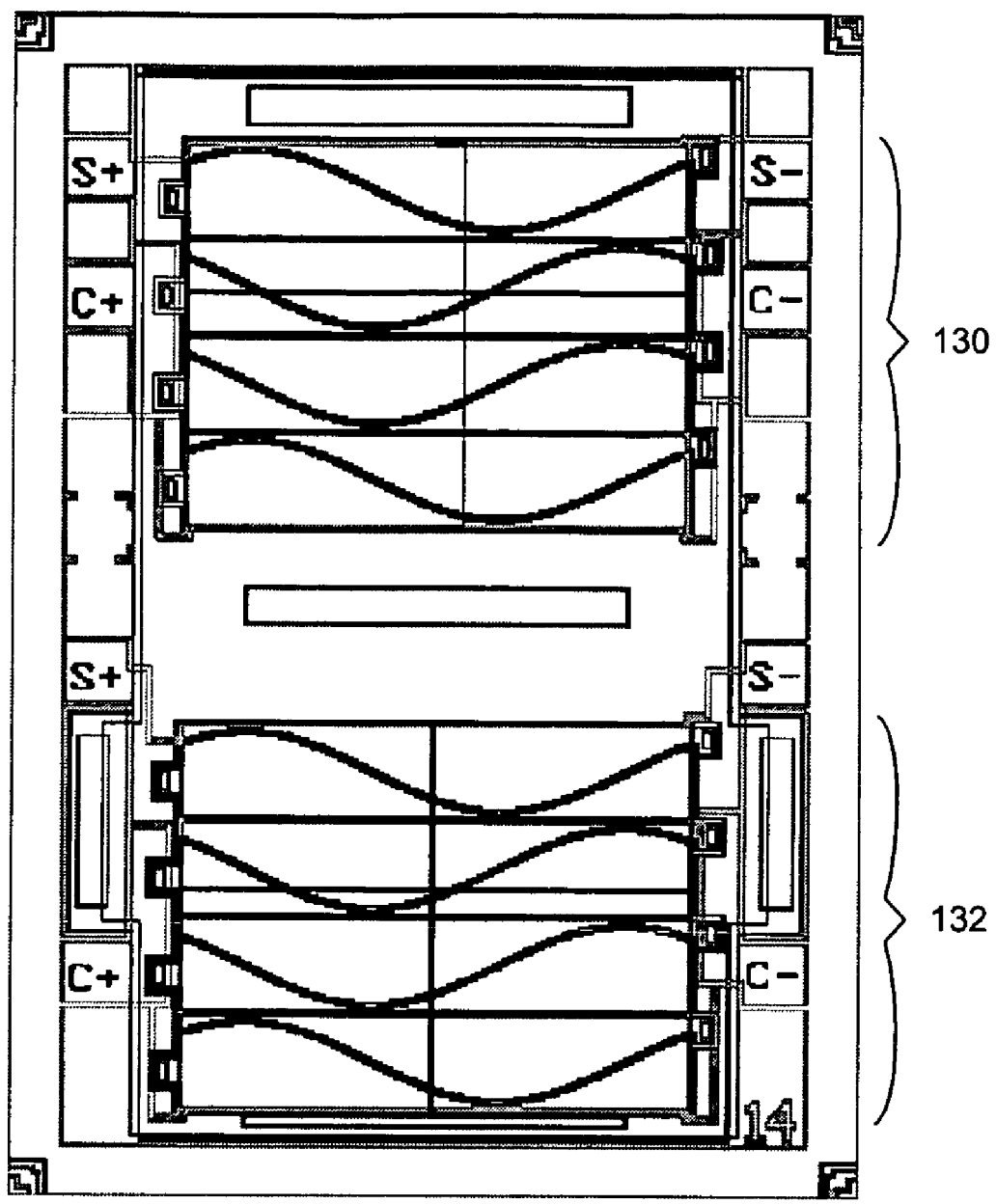
FIG. 27 is a diagram of a pair of detectors for use with two of the coarse tracks of FIG. 26.

There are several ways to create the scale/detector pairs as described above. In one embodiment, the physical arrangement is as follows:
1. For FT and CT1: Detector 79 from FIG. 9, scale pattern from FIG. 10 items 44 and 80.
2. For CT2 and CT3: Scale from FIG. 10 item 80 for each track, and detectors 130 and 132 as shown in FIG. 27. It will be noted that these detectors are similar to the quadrature-shaped detector 79 of FIG. 9. The primary difference is the period, which for each detector 130, 132 is selected to correspond to the period of the corresponding scale CT2 or CT3 from FIG. 26.

Figure 28:
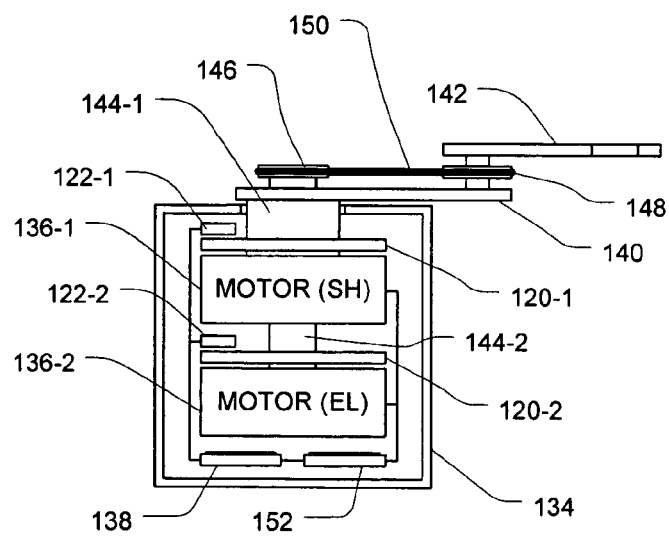
FIG. 28 is an elevation view of a robot arm employing the absolute encoder of FIGS. 24-27.

FIG. 28 illustrates a robot arm utilizing the encoder of FIGS. 24-27. In particular, the arm may be utilized as a so-called wafer-handling robot (WHR) in semiconductor manufacturing operations. The robot arm has a housing 134 encasing two motors 136-1 and 136-2, respective encoder scales 120-1 and 120-2, respective encoder sensors 122-1 and 122-2, and encoder processing circuitry 138. The actual arm component includes an upper arm member 140 and a lower arm member 142 which can also be referred to as an "end effector". The lower arm member 142 is rotatably mounted at a distal end of the upper arm member 140 forming an "elbow" (EL) joint. Similarly, the upper arm member 140 is mounted to a first shaft member 144-1 that is rotatably driven by the first motor 136-1, forming a "shoulder" (SH) joint. The elbow joint is driven by the second motor 136-2 via a second shaft member 144-2, pulleys 146 and 148 and a link belt 150. The overall operation of the robot arm is controlled by motor control circuitry 152 receiving position feedback signals from the encoder processing circuitry 138 and providing drive signals to the motors 136-1 and 136-2.

The first shaft member 144-1 is cylindrical and of slightly larger diameter than the second shaft member 144-2, which extends through the central portion of the first shaft member 144-1 and terminates at the pulley 146. This concentric arrangement of driven members is common in robotics applications, and it demonstrates the significance of the presently disclosed encoder technique. Due to the high-resolution position information provided using the track linking method described herein, the motion of the end effector 142 (e.g. wafer gripper) can be controlled with high accuracy and stability. The large diameter through-hole of the encoder scale 120-1 allows passage of multiple concentric shafts to actuate the different joints of the robot arm. Because of its small radial width W, the outer diameter of the scale can be kept small while still providing such a relatively large through-hole. The small outer diameter allows for a smaller robot housing or base, which reduces the footprint and associated financial overhead in the facility in which the robot is used, such as on a semiconductor fabrication facility floor. Thus, the large ratio of resolution to scale radial width in the disclosed encoder enables a robot design that is optimized for accuracy, stability, and footprint.

Figure 29:
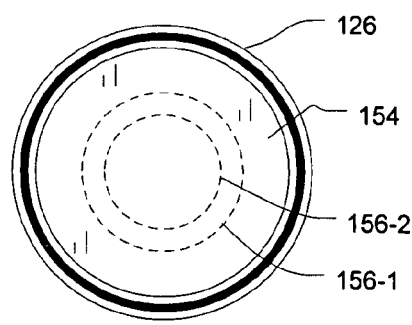
FIG. 29 is a diagram showing the mounting of the scale of FIGS. 24-25 on a hub.

In the illustrated embodiment, the scale substrate 126 has an outer diameter of approximately 4.6" and an inner diameter of approximately 3.2". As shown in FIG. 29, the scale substrate 126 is mounted to a hub 154 that in turn is attached to the respective shaft 144-1 or 144-2. The hub is preferably of a metal material such as stainless steel. It will be appreciated that hubs with different inside diameters (indicated by dotted lines 156-1 and 156-2) are utilized with the different shafts 144-1 and 144-2.

In alternative configurations, a robot arm employing the disclosed absolute encoder may include an additional arm member disposed between the upper arm member 140 and the lower arm member 142 to which the end effector is attached. Such an additional arm member will also include its own motor and a respective drive shaft that passes through the shoulder joint.

Other applications of the disclosed absolute encoder include pedestal azimuth and elevation joints for weapons systems and observatories, as well as for stabilized platforms for inertial guidance systems. These applications may require a large through-hole for a large-diameter, stiff axle. Additionally, the absolute encoder may be useful in converting machinery for converting paper, paperboard, plastic, film, and other materials to flexible packaging, unprinted rolls or sheets, labels, and other finished package products. These applications are increasingly using direct drive motors, which offer several benefits. Many direct-drive designs offer "hollow shaft" configurations (large through-hole) that permit electrical lines, pneumatic lines or other machine components to pass through the motor.

Those skilled in the art will appreciate that embodiments and variations of the present invention other than those explicitly disclosed herein are possible. It is to be understood that modifications to the methods and apparatus disclosed herein are possible while still achieving the objectives of the invention, and such modifications and variations are within the scope of this invention. Accordingly, the scope of the present invention is not to be limited by the foregoing description of embodiments of the invention, but rather only by the claims appearing below.

What is claimed is:

1. A precision material-handling robot, comprising:
   a motor-driven shaft mechanically coupled to an end effector to impart motion thereto;
   an annular scale affixed to the motor-driven shaft, the annular scale including periodic first and second tracks, the period of the second track exceeding the period of the first track by a track ratio;
   detector circuitry operative in response to first and second periodic energy patterns from the first and second tracks respectively to generate corresponding first and second sets of analog signals representing respective amplitudes of the first and second periodic energy patterns at predetermined spatial locations; and
   processing circuitry operative in response to the first and second sets of analog signals to:
   (i) generate first and second position sample values of the first and second tracks respectively, each position sample value being modulo the period of the respective track, the second position sample value having sufficient resolution that a predetermined number of least significant digits of the second position sample value are overlapping digits representing nominally the same position information as corresponding most significant digits of the first position sample value, the predetermined number being determined by the magnitude of uncertainty of a spatial phase relationship between the first and second tracks over a predetermined portion thereof;
   (ii) scale the second position sample value by a number corresponding to the track ratio to form a second position estimate value having the overlapping digits occupying the same digit positions as the corresponding most significant digits of the first position sample value;
   (iii) subtract the first position sample value from the second position estimate value to create a corrected second position estimate value; and
   (iv) combine the first position sample value with a non-overlapping most significant part of the corrected second position estimate value.

2. A material-handling robot according to claim 1, wherein the processor is operative when subtracting the first position sample value from the second position estimate value to (i) calculate, from the first position sample value and a phase offset value, a corresponding inverse position value, the phase offset value representing an average phase offset between the first and second tracks over a predetermined portion of the scale, (ii) calculate a rough step value by adding the inverse position value to the second position estimate value, and (iii) apply a smoothing function to the rough step value to generate the corrected second position estimate value.

3. A material-handling robot according to claim 2, wherein the smoothing function comprises:
   determining which of multiple bracketed ranges the rough step value falls into; and
   changing the rough step value to a predetermined constant value associated with the bracketed range into which the rough step value falls.

4. A material-handling robot according to claim 1, wherein the scale is an optical scale, the first and second tracks comprise respective arrays of optical elements, the periodic energy patterns are optical energy patterns, and the detector circuitry comprises optical detector circuitry.

5. A material-handling robot according to claim 1, wherein:
the second track is one of a set of second tracks on the scale, the second tracks having distinct but generally similar periods and being operative to generate a set of corresponding second periodic energy patterns;
the detector circuitry is operative in response to the second energy patterns to generate corresponding second sets of analog signals, the analog signals within each second set representing amplitudes of the corresponding second energy pattern at predetermined phases; and
the processing circuitry is further operative:
  (i) to generate linked position estimate values for the second tracks, each linked position estimate value incorporating the resolution of the first track; and
  (ii) to generate one or more beat track estimates from the linked position estimate values, each beat track estimate being formed by an algebraic combination of a corresponding pair of the linked position estimate values such that a beat track represented by each beat track estimate has a beat frequency equal to a difference between the frequencies of the second tracks from whose position estimate values the beat track is formed.

6. A material-handling robot according to claim 5, wherein the processing circuitry is further operative to link a predetermined one of the beat track estimates and a predetermined one of the linked position estimate values so as to generate a linked beat estimate representing a linked beat track.

7. A material-handling robot according to claim 5 having at least two of the beat tracks constituting first-level beat tracks, and wherein the processing circuitry is further operative to form a second-level beat track by an algebraic combination of the beat tracks such that the second-level beat track has a beat frequency equal to a difference between the frequencies of the first and second beat tracks.

8. A material-handling robot according to claim 7, wherein the processing circuitry is further operative to (i) link each of the beat track estimates with a predetermined one of the linked position estimate values so as to generate respective linked beat estimates representing first-level linked beat tracks, and (ii) form a second-level beat track by an algebraic combination of the first-level linked beat tracks such that the second-level beat track has a beat frequency equal to a difference between the respective frequencies of the first-level linked beat tracks.

9. A precision material-handling robot according to claim 1, wherein the motor-driven shaft, the annular scale, and the detector circuitry are a first motor-driven shaft, a first annular scale, and first detection circuitry, and further comprising (1) one or more second motor-driven shafts disposed coaxially within the first motor-driven shaft and coupled to respective moving components of the material-handling robot, and (2) one or more second annular scales and second detector circuitries each being generally similar to the first annular scale and first detector circuitry and being operably coupled to a respective one of the second motor-driven shafts to track the respective rotational positions thereof.

10. A precision material-handling robot according to claim 1, dimensioned and configured for use as a wafer-handling robot in a semiconductor manufacturing process.

11. A method of operating a precision material-handling robot having a rotatable member whose rotational position is tracked by a rotary position encoder, the position encoder including an annular scale with first and second periodic tracks formed thereon, the period of the second track exceeding the period of the first track, the method comprising:

generating first and second position sample values of the first and second tracks respectively, each position sample value being modulo the period of the respective track, the second position sample value having sufficient resolution that a predetermined number of least significant digits thereof are overlapping digits representing nominally the same position information as corresponding most significant digits of the first position sample value, the predetermined number being determined by the magnitude of uncertainty of a spatial phase relationship between the first and second tracks over a predetermined portion thereof;

scaling the second position sample value by a number corresponding to the track ratio to form a second position estimate value having the overlapping digits occupying the same digit positions as the corresponding most significant digits of the first position sample value;

subtracting the first position sample value from the second position estimate value to create a corrected second position estimate value; and combining the first position sample value with a non-overlapping most significant part of the corrected second position estimate value.

\* \* \* \* \*

UNITED STATES PATENT AND TRADEMARK OFFICE
CERTIFICATE OF CORRECTION

| | | |
|---|---|---|
| PATENT NO. | : 7,321,113 B2 | Page 1 of 1 |
| APPLICATION NO. | : 11/137675 | |
| DATED | : January 22, 2008 | |
| INVENTOR(S) | : Alva E. Hare, Keith M. Hinrichs and William G. Thorburn | |

It is certified that error appears in the above-identified patent and that said Letters Patent is hereby corrected as shown below:

On the Title Page, insert Item (63) Related U.S. Application Data, should read
-- This application claims priority under 35 U.S.C. .sctn. 120 of U.S. patent application Ser. No. 10/990,769 filed Nov. 17, 2004, which claims priority under 35 U.S.C. .sctn. 119(e) of U.S. provisional patent application 60/520,926 filed Nov. 17, 2003. --

Signed and Sealed this

Sixth Day of May, 2008

JON W. DUDAS
*Director of the United States Patent and Trademark Office*